(12) United States Patent
Chen

(10) Patent No.: US 12,477,555 B2
(45) Date of Patent: *Nov. 18, 2025

(54) SIGNAL RECEIVING METHOD, SIGNAL TRANSMISSION METHOD, USER EQUIPMENT, AND NETWORK DEVICE

(71) Applicant: VIVO MOBILE COMMUNICATION CO., LTD., Guangdong (CN)

(72) Inventor: Li Chen, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 407 days.

This patent is subject to a terminal disclaimer.

(21) Appl. No.: 18/072,583

(22) Filed: Nov. 30, 2022

(65) Prior Publication Data

US 2023/0091129 A1    Mar. 23, 2023

Related U.S. Application Data

(63) Continuation of application No. 16/960,191, filed as application No. PCT/CN2019/070366 on Jan. 4, 2019, now Pat. No. 11,546,898.

(30) Foreign Application Priority Data

Jan. 5, 2018    (CN) .......................... 201810012440.7

(51) Int. Cl.
*H04W 72/23* (2023.01)
*H04B 7/06* (2006.01)
(Continued)

(52) U.S. Cl.
CPC ............ *H04W 72/23* (2023.01); *H04B 7/068* (2013.01); *H04B 7/0891* (2013.01); *H04L 5/0053* (2013.01); *H04W 24/02* (2013.01)

(58) Field of Classification Search
None
See application file for complete search history.

(56) References Cited

U.S. PATENT DOCUMENTS

2013/0286960 A1    10/2013    Li et al.
2014/0128109 A1    5/2014    Li et al.
(Continued)

FOREIGN PATENT DOCUMENTS

CN    103582140 A    2/2014
CN    103686689 A    3/2014
(Continued)

OTHER PUBLICATIONS

Vivo., "Discussion on NR paging design," 3GPP TSG-RAN WG2 Meeting #99, R2-1708434, pp. 1-5, (Aug. 21-25, 2017).
(Continued)

*Primary Examiner* — Walter J Divito
(74) *Attorney, Agent, or Firm* — BROOKS KUSHMAN P.C.

(57) ABSTRACT

A signal receiving method, a signal transmission method, UE, and a network device are provided. The signal receiving method includes: determining a frequency domain position and/or spatial domain position for receiving a signal, wherein the frequency domain position includes one or more of a plurality of frequency domain positions, and the spatial domain position includes one or more of a plurality of spatial domain positions; and receiving the signal at the determined frequency domain position and/or spatial domain position. The signal is one or more of a pre-indication signal, information carried in a PDCCH, and a paging message.

20 Claims, 5 Drawing Sheets

101

Determining a frequency domain position and/or spatial domain position for receiving a signal

103

Receiving the signal at the determined frequency domain position and/or spatial domain position

(51) Int. Cl.
*H04B 7/08* (2006.01)
*H04L 5/00* (2006.01)
*H04W 24/02* (2009.01)

(56) References Cited

U.S. PATENT DOCUMENTS

| | | |
|---|---|---|
| 2015/0256299 A1 | 9/2015 | Gong et al. |
| 2016/0047884 A1 | 2/2016 | Zhang et al. |
| 2017/0272998 A1 | 9/2017 | Choi et al. |
| 2018/0115361 A1 | 4/2018 | Li et al. |
| 2018/0234919 A1 | 8/2018 | Tsuda et al. |
| 2019/0082472 A1 | 3/2019 | Zhang et al. |
| 2019/0208482 A1 | 7/2019 | Tooher et al. |
| 2019/0281481 A1 | 9/2019 | Shen |
| 2020/0092846 A1 | 3/2020 | Deng et al. |
| 2020/0374036 A1 | 11/2020 | Seo et al. |

FOREIGN PATENT DOCUMENTS

| | | |
|---|---|---|
| CN | 103716895 A | 4/2014 |
| CN | 106454901 A | 2/2017 |
| CN | 106605376 A | 4/2017 |
| CN | 107371242 A | 11/2017 |
| CN | 107534476 A | 1/2018 |
| WO | 2010/105461 A1 | 9/2010 |

OTHER PUBLICATIONS

Vivo., "Remaining details on NR paging design," 3GPP TSG RAN WG1 Meeting #90bis, R1-1717462, pp. 1-5, (Oct. 9-13, 2017).
3rd Generation Partnership Project Technical Specification Group Radio Access Network NR Radio Resource Control (RRC) Protocol specification (Release 15), 3GPP TS 38.331 V1.0.0, pp. 1-188, (Dec. 17, 2017).
CN First Office Action dated May 27, 2020 as received in Application No. 201810012440.7.
International Search Report and Written Opinion of the International Searching Authority dated Jul. 16, 2020 as received in Application No. PCT/CN2019/070366.
Extended European Search Report dated Jan. 13, 2021 as received in Application No. 19736140.5.
CN Fourth Office Action dated Mar. 3, 2021 as received in Application No. 201810012440.7.
US Non-Final Office Action dated Jul. 26, 2021 as received in U.S. Appl. No. 16/960,191.
EP Office Action dated Feb. 17, 2023 as received in Application No. 19736140.5.

SIGNAL RECEIVING METHOD, SIGNAL TRANSMISSION METHOD, USER EQUIPMENT, AND NETWORK DEVICE

CROSS-REFERENCE TO RELATED APPLICATION

The present application is a continuation application of U.S. patent application Ser. No. 16/960,191 filed on Jul. 6, 2020, the U.S. patent application is a U.S. national phase application of a PCT Application No. PCT/CN2019/070366 filed on Jan. 4, 2019, which claims a priority to Chinese patent application No. 201810012440.7 filed in China on Jan. 5, 2018, disclosures of which are incorporated in their entireties by reference herein.

TECHNICAL FIELD

The present disclosure relates to the field of communication/terminal, in particular to a signal receiving method, a signal transmission method, user equipment (UE), and a network device.

BACKGROUND

With the development of mobile communication technologies, a fifth-generation (5G) mobile communication system has emerged. To support higher system throughput and user throughput, the 5G system supports frequency domain division and spatial domain division, so that UE can receive signals at different frequency domain positions and/or spatial domain positions.

For example, a 5G system supports a system bandwidth of up to 400 MHz, which is far greater than a system bandwidth of up to 20 MHz in Long Term Evolution (LTE). Therefore, higher system and user throughputs are supported. In addition, the 5G system also supports dynamic and flexible bandwidth allocation. A system bandwidth may be divided into a plurality of bandwidth parts (BWPs) to support narrowband UE or UE in a power saving mode, so that the UE only needs to operate in a part of the system bandwidth.

For another example, the 5G system also supports an operating frequency band above 6 GHz, to provide a higher data transmission throughput. Because a high-frequency signal has a short wavelength, compared with a low frequency band signal, a panel of given size may accommodate more antenna array elements, so that a plurality of beams with higher directivity and narrower lobes may be formed by using a beamforming technique. The 5G system can transmit broadcast signals or system information to UE in a cell by using a beam sweeping technique.

The related art is silent about how to transmit and receive signals at a plurality of frequency domain positions (for example, there are a plurality of BWPs) and/or a plurality of spatial domain positions (for example, there are a plurality of beams). Therefore, when there are a plurality of frequency domain positions and/or a plurality of spatial domain positions, how a network device transmits a signal to UE and how the UE receives the signal transmitted by the network device become problems that urgently need to be resolved.

SUMMARY

The present disclosure provides in some embodiments a signal receiving method, a signal transmission method, UE, and a network device, so that when there are a plurality of frequency domain positions and/or a plurality of spatial domain positions, a network device can transmit a signal to UE, and the UE can receive the signal transmitted by the network device.

According to a first aspect, a signal receiving method is provided. The signal receiving method is performed by UE and includes:

determining a frequency domain position and/or spatial domain position for receiving a signal, wherein the frequency domain position includes one or more of a plurality of frequency domain positions, and the spatial domain position includes one or more of a plurality of spatial domain positions; and receiving the signal at the determined frequency domain position and/or spatial domain position, where the signal is one or more of a pre-indication signal, information carried in a physical downlink control channel (PDCCH), and a paging message;

wherein, when the signal is the information carried in the PDCCH, the determining the frequency domain position and/or spatial domain position for receiving the signal includes:

determining a frequency domain position and/or spatial domain position for monitoring the PDCCH, the receiving the signal at the determined frequency domain position and/or spatial domain position includes:

monitoring the PDCCH at the determined frequency domain position and/or spatial domain position; and receiving the information carried in the PDCCH;

or, when the signal is the paging message, the determining the frequency domain position and/or spatial domain position for receiving the signal includes:

determining, according to the information carried in the received PDCCH, a frequency domain position and/or spatial domain position for receiving the paging message.

According to a second aspect, a signal transmission method is provided. The signal transmission method is performed by a network device and includes:

determining a frequency domain position and/or spatial domain position for transmitting a signal, wherein the frequency domain position includes one or more of a plurality of frequency domain positions, and the spatial domain position includes one or more of a plurality of spatial domain positions; and transmitting the signal at the determined frequency domain position and/or spatial domain position, where the signal is one or more of a pre-indication signal, information carried in a PDCCH, and a paging message;

wherein, when the signal is the information carried in the PDCCH, the determining the frequency domain position and/or spatial domain position for transmitting the signal includes:

determining a frequency domain position and/or spatial domain position at which user equipment (UE) monitors the PDCCH, the transmitting the signal at the determined frequency domain position and/or spatial domain position includes:

transmitting the information carried in the PDCCH at the determined frequency domain position and/or spatial domain position;

or, when the signal is the paging message, the determining the frequency domain position and/or spatial domain position for transmitting the signal includes:

determining, according to the information carried in the PDCCH transmitted to user equipment (UE), a frequency domain position and/or spatial domain position for transmitting the paging message.

According to a third aspect, UE is provided. The UE includes: a processor, a storage, and a computer program stored in the storage and configured to be executed by the processor, where the processor is configured to execute the computer program to implement the steps in the signal receiving method according to the first aspect.

According to a fourth aspect, a computer-readable storage medium storing therein a computer program is provided, where the computer program is configured to be executed by a processor, to implement the steps in the signal receiving method according to the first aspect.

According to a fifth aspect, a network device is provided. The network device includes: a storage, a processor, and a computer program stored in the storage and configured to be executed by the processor, where the processor is configured to execute the computer program to implement the steps in the signal transmission method according to the second aspect.

According to a sixth aspect, a computer-readable storage medium storing therein a computer program is provided, where the computer program is configured to be executed by a processor, to implement the steps in the signal transmission method according to the second aspect.

In some embodiments of the present disclosure, before receiving a signal, UE first determines a frequency domain position and/or spatial domain position for receiving the signal; correspondingly, before transmitting a signal to the UE, a network device first determines a frequency domain position and/or spatial domain position for transmitting the signal. Therefore, when there are a plurality of frequency domain positions and/or a plurality of spatial domain positions, by means of the method provided in some embodiments of the present disclosure, a network device can transmit a signal to UE, and the UE can receive the signal transmitted by the network device.

BRIEF DESCRIPTION OF THE DRAWINGS

The accompanying drawings described herein are used to provide a further understanding of the present disclosure and constitute a part of the present disclosure, and the schematic embodiments of the present disclosure and the description thereof are used to explain the present disclosure and do not constitute an improper limitation on the present disclosure. In the accompanying drawings.

DETAILED DESCRIPTION

The following clearly and completely describes the technical solutions in some embodiments of the present disclosure with reference to the accompanying drawings in some embodiments of the present disclosure. Apparently, the described embodiments are merely some rather than all of the embodiments of the present disclosure. All other embodiments obtained by persons of ordinary skill in the art based on the embodiments of the present disclosure without creative efforts shall fall within the scope of the present disclosure.

The technical solutions of the present disclosure may be applied to various communication systems provided with a plurality of frequency domain positions or spatial domain positions, for example, a 5G mobile communication system, LTE or eLTE connected to a 5G core network (5GC) (an evolved universal mobile telecommunications system (UMTS) terrestrial radio access (E-UTRA) connected to the 5GC) or the like.

User equipment (UE), which may also be referred to as a mobile terminal, mobile UE or the like, may communicate with one or more core networks through a radio access network (RAN). The UE may be a mobile terminal, for example, a mobile phone (or referred to as a "cellular" phone) or a computer equipped with a mobile terminal, for example, the UE may be a portable, pocket-sized, handheld, computer built-in or in-vehicle mobile apparatus, which exchanges voice and/or data with the RAN.

The base station may be a base transceiver station (BTS) in a global system for mobile communications (GSM) or code division multiple access (CDMA), or may be a Node B in wideband code division multiple access (WCDMA), or may be an evolved Node B (eNB or eNodeB) in LTE or a 5G gNodeB (gNB), which is not limited in the present disclosure. However, for ease of description, a gNB is used as an example for description in the following embodiments.

The technical solutions provided in the embodiments of the present disclosure are described below in detail with reference to the accompanying drawings.

Figure 1:
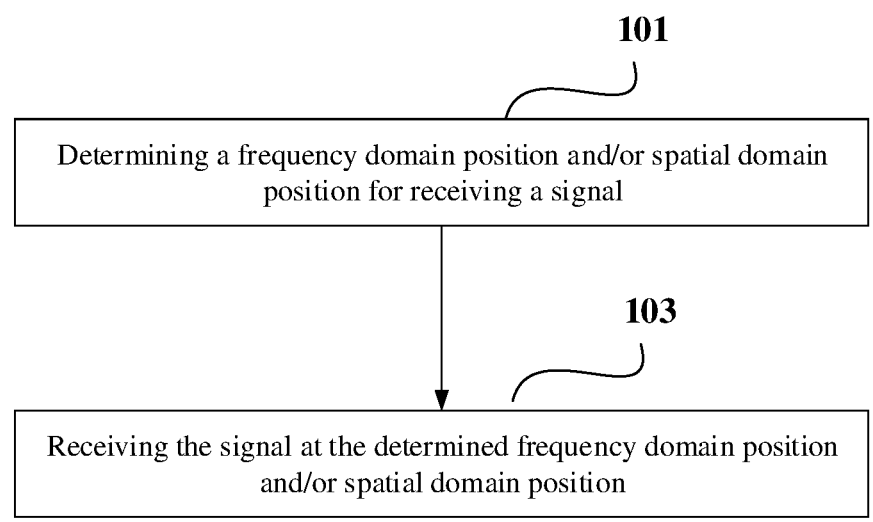
FIG. 1 is a schematic flowchart of a signal receiving method performed by UE according to some embodiments of the present disclosure.

Referring to FIG. 1, the present disclosure provides in some embodiments a signal receiving method. The method is performed by UE and may include the following steps.

A step 101 includes: determining a frequency domain position and/or spatial domain position for receiving a signal, where the frequency domain position includes one or more of a plurality of frequency domain positions, and the spatial domain position includes one or more of a plurality of spatial domain positions.

A step 103 includes: receiving the signal at the determined frequency domain position and/or spatial domain position.

To receive and transmit signals more flexibly, a frequency domain and/or spatial domain may be divided in a 5G system. For a communication system having a plurality of frequency domain positions, for example, a communication system in which a system bandwidth is divided into a plurality of parts to form a plurality of BWPs, by performing step 101, the UE may determine the frequency domain position for receiving the signal from the plurality of frequency domain positions. For a communication system having a plurality of spatial domain positions, for example, a communication system in which a beamforming technique is used to form a plurality of beams with higher directivity and narrower lobes, by performing step 101, the UE may determine the spatial domain position for receiving the signal from the plurality of spatial domain positions.

It can be understood that a manner of dividing a frequency domain is not limited to the dividing a system bandwidth into BWPs in the foregoing example. A frequency band, a carrier or a component carrier of the system may be divided to form a plurality of frequency domain positions as well. A manner of dividing a spatial domain is not limited to the forming a plurality of beams in the foregoing example. A carrier, a transmission reception point (TRP) or quasi co-location (QCL) may be divided to form a plurality of spatial domain positions as well. This is not limited in some embodiments of the present disclosure.

It may further be understood that in the communication system, it is possible to divide only a frequency domain to form a plurality of frequency domain positions, or to divide only a spatial domain to form a plurality of spatial domain positions, or to divide both a spatial domain and a frequency domain to form a plurality of frequency domain positions in the frequency domain and a plurality of spatial domain positions in the spatial domain. Correspondingly, during the execution of step 101, depending on different division manners of the frequency domain and/or spatial domain in the communication system, the determined frequency domain positions and/or spatial domain positions are different, and the frequency domain positions and/or spatial domain positions at which signals are received are different. Specifically:

(1) If there are only a plurality of frequency domain positions, the frequency domain position for receiving the signal may be determined by performing step 101 (it may be understood that one or more frequency domain positions may be determined). As a result, when the UE performs step 103, the signal is received at the determined frequency domain position. It may further be understood that the UE receives the signal in the full spatial domain at this time.

(2) If there are only a plurality of spatial domain positions, the spatial domain position for receiving the signal may be determined by performing step 101 (it may be understood that one or more spatial domain positions may be determined). As a result, when the UE performs step 103, the signal is received at the determined spatial domain position. It may further be understood that the UE receives the signal in the full frequency domain at this time.

(3) If there are a plurality of frequency domain positions and spatial domain positions at the same time, both the frequency domain position for receiving the signal and the spatial domain position for receiving the signal may be determined by performing step 101. As a result, when the UE performs step 103, the signal is received at the determined frequency domain position and spatial domain position.

It needs to be noted that according to the solution provided in some embodiments of the present disclosure, the determination of a frequency domain position and the determination of a spatial domain position are completely independent and not related to each other. Various aspects such as a determination manner, determination timing, information on which the determination is based, a determination sequence for determining a frequency domain position are relatively independent of those for determining a spatial domain position, and may be the same as or different from those for determining the spatial domain position.

Therefore, it may be understood that in some embodiments of the present disclosure, a frequency domain position and spatial domain position are relatively independent concepts. None of the calculation of a frequency domain position, information related to a frequency domain position, a parameter of a determined frequency domain position is related to a spatial domain position. From the "frequency domain position and/or spatial domain position" in step 101 and the "frequency domain position and/or spatial domain position" in step 103, it should be understood that if step 101 is performed to only determine the frequency domain position for receiving the signal from the plurality of frequency domain positions, during the execution of step 103, the signal is received at the determined frequency domain position. It may be understood that the UE may receive the signal in the full spatial domain at this time. If step 101 is performed to only determine the spatial domain position for receiving the signal from the plurality of spatial domain positions, during the execution of step 103, the signal is received at the determined spatial domain position. It may be understood that the UE may receive the signal in the full frequency domain at this time. If step 101 is performed to both determine the frequency domain position for receiving the signal from the plurality of frequency domain positions and determine the spatial domain position for receiving the signal from the plurality of spatial domain positions, during the execution of step 103, the signal is received at both the determined frequency domain position and the determined spatial domain position. The same description that appears in other steps in some embodiments of the present disclosure may be understood in the same manner, and details are not described again hereinafter.

In some embodiments of the present disclosure, before receiving a signal, UE first determines a frequency domain position and/or spatial domain position for receiving the signal; correspondingly, before transmitting a signal to the UE, a network device first determines a frequency domain position and/or spatial domain position for transmitting the signal. Therefore, when there are a plurality of frequency domain positions and/or a plurality of spatial domain positions, by means of the method provided in some embodiments of the present disclosure, a network device can transmit a signal to UE, and the UE can receive the signal transmitted by the network device.

In addition, in a communication system with a plurality of frequency domain positions and/or spatial domain positions, if UE needs to perform blind detection in the full frequency domain and/or full spatial domain when receiving a signal, the power consumption of the UE is relatively high, impacting the continuous operating duration of the UE. By means of the solution provided in some embodiments of the present disclosure, a signal is received only at a determined frequency domain position and/or spatial domain position, so that the power consumption of UE can be effectively reduced, which helps to satisfy a user requirement.

Specific implementations of some embodiments of the present disclosure are described below in detail by taking the case in which a plurality of BWPs are obtained through division to form a plurality of frequency domain positions and/or a spatial domain is divided to form a plurality of beams for example.

It may be understood that, in this case, the frequency domain position corresponds to a BWP identifier, and the spatial domain position corresponds to a beam identifier. The correspondence may be understood as that a determined frequency domain position may be located by using a BWP identifier, and a determined spatial domain position may be located by using a beam identifier. It may be understood that a manner of locating a frequency domain position is not limited to using a BWP identifier, and a manner of locating a spatial domain position is also not limited to using a beam identifier.

The frequency domain position for receiving the signal that is determined according to some embodiments of the present disclosure may be any one of a BWP including a cell-defining synchronization signal block, a BWP for initial access to a cell or a BWP including system information. The spatial domain position for receiving the signal that is determined according to some embodiments of the present disclosure may be any one of a beam for a cell-defining synchronization signal block, a beam for initial access to a cell or a beam for receiving system information.

During the execution of step 101 of determining the frequency domain position and/or spatial domain position for receiving the signal, there may be a plurality of methods. Four major manners are illustrated below one by one.

(1) The frequency domain position and/or spatial domain position for receiving the signal may be determined according to initial information predetermined in a protocol.

In this manner, the initial information may be written into the UE according to a protocol, to inform the UE of the frequency domain position and/or spatial domain position for receiving the signal. Correspondingly, a frequency domain position and/or spatial domain position for transmitting the signal to the UE is also configured in the network device, so that the transmission of the signal to the UE by the network device can be implemented.

(2) The frequency domain position and/or spatial domain position for receiving the signal may be determined according to received preset default information.

In this manner, the preset default information received by the UE is usually transmitted by the network device, so that the network device may configure a parameter for the UE. It needs to be noted that, the default configuration of the UE by the network device is usually unchangeable, and can be changed only after the network device reconfigures the UE. It further needs to be noted that the preset default information configured by the network device for the UE usually not only defines the frequency domain position and/or spatial domain position for receiving the signal, but also provides the UE with default parameters in various aspects such as signal reception and transmission.

(3) Signal reception configuration information may be received, and the frequency domain position and/or spatial domain position for receiving the signal may be determined according to the signal reception configuration information.

It needs to be noted that the signal reception configuration information is configured for the UE to determine the frequency domain position and/or spatial domain position for receiving the signal. In this manner, the signal reception configuration information received by the UE may be one or more of:

a dedicated radio resource control (RRC) message, an RRC connection resume message, an RRC connection release message, an RRC connection reconfiguration message, an RRC connection configuration message, a master information block (MIB) message, a system information block (SIB) message, a message carried in a control resource set (CORESET), or a message carried in a downlink control information (DCI) corresponding to a PDCCH.

When the frequency domain position and/or spatial domain position for receiving the signal is determined according to the signal reception configuration information, any one of the foregoing signal reception configuration information may be used. It needs to be noted that, for a certain instance of determining the frequency domain position and/or spatial domain position for receiving the signal, only one of the foregoing signal reception configuration information is used; and depending on the signal reception configuration information available to the UE, different signal reception configuration information may be used for different instances of determining the frequency domain position and/or spatial domain position for receiving the signal.

(4) The frequency domain position and/or spatial domain position for receiving the signal is determined according to an identifier of the UE.

Figure 2:
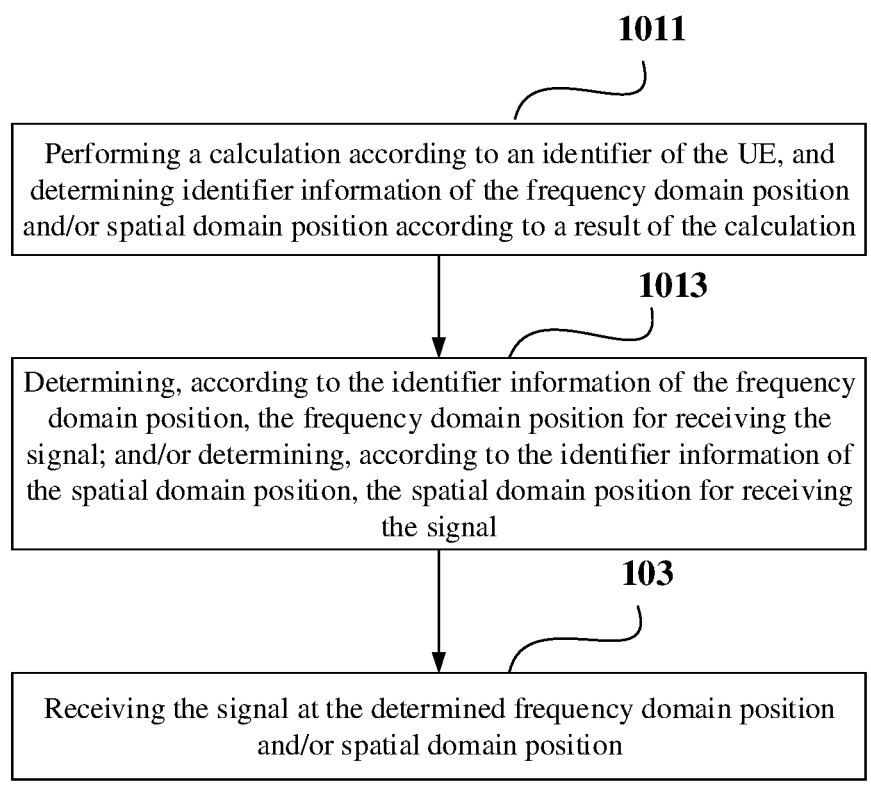
FIG. 2 is another schematic flowchart of a signal receiving method performed by UE according to some embodiments of the present disclosure.

Specifically, referring to FIG. 2, when the frequency domain position and/or spatial domain position for receiving the signal is determined according to the identifier of the UE, step 101 may include the following substeps.

A substep 1011 includes: performing a calculation according to the identifier of the UE, and determining the identifier information of the frequency domain position and/or spatial domain position according to the result of the calculation.

A substep 1013 includes: determining, according to the identifier information of the frequency domain position, the frequency domain position for receiving the signal; and/or determining, according to the identifier information of the spatial domain position, the spatial domain position for receiving the signal.

It needs to be noted that when the frequency domain position and/or spatial domain position for receiving the signal is determined according to the identifier of the UE, the used identifier of the UE (UE ID) may correspond to unique UE or may correspond to a plurality of different UEs. In addition, the used UE ID may be a complete UE identifier UE_ID or may be a part obtained by truncating the UE identifier. In practice, the foregoing identifier of the UE may be determined according to the complete UE_ID. More specifically, the UE_ID may be any one of an international mobile subscriber identification number (IMSI), an system architecture evolution (SAE)-temporary mobile subscriber identity (S-TMSI), a TMSI, a Packet-TMSI (P-TMSI), a Configured ID (for example, release for idle), a Resume ID, a cell radio network temporary identifier (C-RNTI), or the like.

A specific process of substep 1011 of performing a calculation according to the identifier of the UE, and determining the identifier information of the frequency domain position and/or spatial domain position according to the result of the calculation is illustrated below.

In a first manner, the execution of the substep 1011 of performing a calculation according to the identifier of the UE, and determining the identifier information of the frequency domain position and/or spatial domain position according to the result of the calculation includes:

calculating a first ratio of the identifier of the UE to a first quantity, where the first quantity is a total quantity of time domain resource positions available for transmitting the signal within one period; and rounding down the first ratio and calculating the rounded-down first ratio modulo a total quantity of frequency domain positions available for transmitting the signal, to obtain identifier information of the frequency domain position; and/or rounding down the first ratio and calculating the rounded-down first ratio modulo a total quantity of spatial domain positions available for transmitting the signal, to obtain identifier information of the spatial domain position.

Specifically, taking the determination of the identifier information of the frequency domain position (specifically, a BWP identifier, which may be represented by a position number X of a BWP, where the position number X and the BWP identifier function identically) for example, the calculation may use the following formula:

the position number $X$ of the BWP=floor($UE\_ID$/($N*Ns$))mod $Nn$, where:

Nn represents a total quantity of BWPs available for transmitting the signal in the cell;

N represents the lesser one of T and nB, and is designated as min(T, nB);

Ns represents the greater one of 1 and nB/T, and is designated as max(1, nB/T);

T represents a period of the UE for receiving the signal; and nB represents how often the UE receives the signal, and may be 4T, 2T, T, T/2, T/4, T/8, T/16, T/32, T/64 or T/128. The value is configured by the network device for the UE or is predetermined in a protocol.

It may be understood that a calculation result of N*Ns is the foregoing first quantity, and is used for reflecting the total quantity of time domain resource positions available for transmitting the signal within one period. A calculation result of UE_ID/(N*Ns) is the foregoing first ratio.

In a second manner, the execution of the substep 1011 of performing a calculation according to the identifier of the UE, and determining the identifier information of the frequency domain position and/or spatial domain position according to the result of the calculation includes:

calculating a second ratio of the identifier of the UE to a second quantity, where the second quantity is a period for receiving the signal; and rounding down the second ratio and calculating the rounded-down second ratio modulo a total quantity of frequency domain positions available for transmitting the signal, to obtain identifier information of the frequency domain position; and/or rounding down the second ratio and calculating the rounded-down second ratio modulo a total quantity of spatial domain positions available for transmitting the signal, to obtain identifier information of the spatial domain position.

Specifically, taking the determination of the identifier information of the frequency domain position (specifically, a BWP identifier, which may be represented by a position number X of a BWP, where the position number X and the BWP identifier function identically) for example, the calculation may use the following formula:

the position number $X$ of the BWP=floor($UE\_ID/N$) mod $Nn$, where:

the meaning of N is the same as that in the first manner, or N may be 1;

Nn represents a total quantity of BWPs available for transmitting the signal in the cell.

It may be understood that N is the foregoing second quantity, and represents a period for receiving the signal. UE_ID/N is the foregoing second ratio.

It needs to be noted that a determination principle of the first manner is similar to that of the second manner. The difference lies in that different denominators are used in combination with the UE ID, thereby impacting a value range of the calculation result. During the determination as to which manner should be used for calculation, a specific calculation manner may be chosen according to a protocol and in consideration of a quantity of resource positions and the value range of the UE ID, as long as the same result can be derived when the network device and the UE use the same calculation manner, so that the network device and the UE may determine the same frequency domain position and/or spatial domain position.

In a third manner, the execution of the substep 1011 of performing a calculation according to the identifier of the UE, and determining the identifier information of the frequency domain position and/or spatial domain position according to the result of the calculation may include:

calculating a first ratio of the identifier of the UE to a first quantity, where the first quantity is a total quantity of resource positions available for transmitting the signal within one period; and rounding down the first ratio and calculating the rounded-down first ratio modulo a weight sum of frequency domain positions available for transmitting the signal, and determining the identifier information of the frequency domain position according to a value of x that satisfies a first preset condition; and/or rounding down the first ratio and calculating the rounded-down first ratio modulo a weight sum of spatial domain positions available for transmitting the signal, and determining the identifier information of the spatial domain position according to a value of x that satisfies a second preset condition.

The first preset condition is that a result of the modulo operation is less than a weight sum of frequency domain positions of x number of signals, and/or the second preset condition is that a result of the modulo operation is less than a weight sum of spatial domain positions of x number of signals.

Specifically, taking the determination of the identifier information of the frequency domain position (specifically, a BWP identifier, which may be represented by a position number x of a BWP, where the position number x and the BWP identifier function identically) for example, the calculation may use the following formula:

(Floor($UE\_ID/(N*Ns)$))mod $W$<$\Sigma W(i)$($i$=0 to $x$)

where:

UE_ID represents the foregoing UE identifier UE_ID;

W(i) represents a weight of a BWP labeled as BWP_i, a weight of each BWP is configured on a network device side or predetermined in a protocol;

W represents a total weight of all BWPs for transmitting the signal in the cell, that is, W=W(0)+W(1)+ . . . +W(Nn−1);

Nn represents a total quantity of BWPs available for transmitting the signal in the cell;

N represents the lesser one of T and nB, and is designated as min(T, nB);

Ns represents the greater one of 1 and nB/T, and is designated as max(1, nB/T);

T represents a period of the UE for receiving the signal; and nB represents how often the UE receives the signal, and may be 4T, 2T, T, T/2, T/4, T/8, T/16, T/32, T/64 or T/128. The value is configured by the network device for the UE or is predetermined in a protocol.

It may be understood that (Floor(UE_ID/(N*Ns)) mod W) is a calculation result obtained by rounding down the first ratio and calculating the rounded-down first ratio modulo a weight sum of frequency domain positions available for transmitting the signal. According to this calculation result, the identifier information of the frequency domain position is determined according to a value of x that satisfies the first preset condition, where the first preset condition is that a result of the modulo operation is less than the weight sum of frequency domain positions of x number of signals.

An embodiment lies in that the least x among x values satisfying the first preset condition (0≤x≤(Nn−1)) may be determined as the identifier information of the frequency domain position.

It needs to be noted that, in the foregoing example, the number of the BWP starts from 0. In practice, the number of the BWP may start from 1, then the foregoing formula may be represented as:

(Floor(UE_ID/(N*Ns))mod W)<W(1)+W(2)+W(x).

It further needs to be noted that the determination of the weight of the BWP is configured on a network side or predetermined in a protocol. During determination, various factors may be considered. For example, the greater quantity of UEs a BWP corresponds to, the lower the weight of the BWP may be set; for another example, the greater the bandwidth of a BWP is, the higher the weight of the BWP may be set; for still another example, the higher the frequency of a BWP is, the lower the weight of the BWP may be set; and vice versa.

It may be understood that the foregoing three calculation manners are all used to determine a frequency domain position. In condition that the UE needs to determine the spatial domain position for receiving the signal, the frequency domain related parameters in the foregoing formula may be replaced with corresponding spatial domain related parameters. Details are not described herein again.

In the three calculation manners in the foregoing examples, information of the frequency domain position and/or spatial domain position available for transmitting the signal needs to be used. Therefore, before calculation is performed according to the identifier of the UE, the information of the frequency domain position and/or spatial domain position available for transmitting the signal can be received firstly. In the third calculation manner in the foregoing example, additionally, the information of the weight of each frequency domain position and/or spatial domain position available for transmitting the signal needs to be used. Therefore, before the third calculation manner is used for calculation, it is necessary to receive the information of the frequency domain position and/or spatial domain position available for transmitting the signal, and the weight of each frequency domain position and/or spatial domain position available for transmitting the signal.

Figure 3:
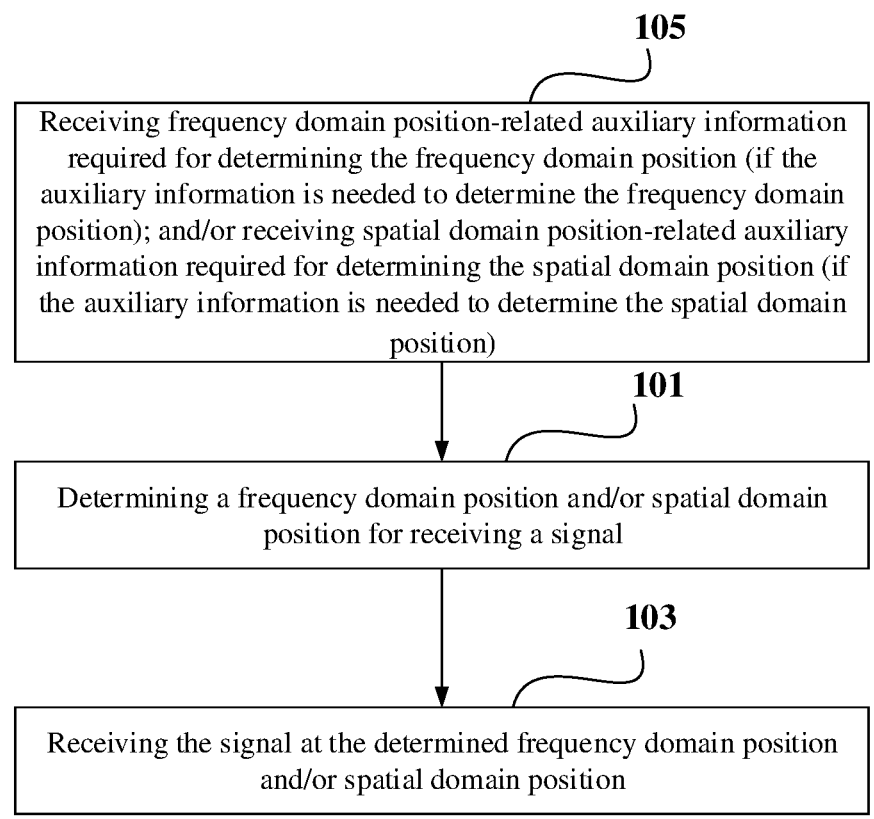
FIG. 3 is still another schematic flowchart of a signal receiving method performed by UE according to some embodiments of the present disclosure.

Various manners of determining the frequency domain position and/or spatial domain position for receiving the signal are illustrated above. It needs to be noted that, no matter which manner provided in some embodiments of the present disclosure is used for determining the frequency domain position and/or spatial domain position for receiving the signal, auxiliary information may be used in conjunction during determination. It can be understood that if the auxiliary information is used to determine the frequency domain position and/or spatial domain position, before the frequency domain position and/or spatial domain position for receiving the signal is determined, the method in some embodiments of the present disclosure may include a step 105 in the following, as shown in FIG. 3.

The step 105 includes: receiving frequency domain position-related auxiliary information required for determining the frequency domain position (if the auxiliary information is needed to determine the frequency domain position); and/or receiving spatial domain position-related auxiliary information required for determining the spatial domain position (if the auxiliary information is needed to determine the spatial domain position).

In this case, when any of the foregoing four manners or other manner is used to determine the frequency domain position and/or spatial domain position for receiving the signal, the frequency domain position-related auxiliary information and/or the spatial domain position-related auxiliary information may be used in conjunction to determine the frequency domain position and/or spatial domain position for receiving the signal.

Specifically, the frequency domain position-related auxiliary information may include one or more of: a BWP identifier, a frequency value and/or a frequency identifier, a bandwidth value and/or a bandwidth identifier, a sub-carrier spacing (SCS) identifier, a numerology identifier, a physical resource block (PRB) identifier, an offset and/or an identifier of an offset between the frequency domain position for receiving the signal and a reference frequency, a PRB offset and/or an identifier of a PRB offset between the frequency domain position for receiving the signal and a cell reference PRB.

Specifically, the spatial domain position-related auxiliary information may include one or more of: a beam identifier, a beam pair QCL identifier, a TRP identifier, a synchronization signal block (SSB) identifier, a channel state information-reference signal (CSI-RS) identifier, and a demodulation reference signal (DMRS) identifier.

In practice, a specific process of determining the frequency domain position and/or spatial domain position for receiving the signal may be different depending on the auxiliary information, and is determined according to specific requirements, which is not limited in the present disclosure.

In one scenario, the solution provided in some embodiments of the present disclosure may be used to receive a pre-indication signal. The pre-indication signal mentioned herein may be a wake-up signal (WUS) in a related communication protocol or under discussion by a standardization organization, or may be a go-to-sleep signal in a related communication protocol, or may be referred to as a pre-indication signal (PIS), a paging indication signal or the like.

It may be understood that in an example in which the pre-indication signal is a WUS, in every discontinuous reception (DRX) cycle of an idle state or an RRC connected state, before the UE performs blind detection of a paging signal or a PDCCH, the network device (specifically a base station) first transmits a WUS to the UE, and the UE wakes up at a corresponding moment to detect the WUS. If the WUS is detected, the UE performs blind detection of a paging signal or a PDCCH; otherwise, the UE does not perform blind detection of a paging signal or a PDCCH (stays asleep). Compared with blind detection of a paging signal or a PDCCH, the detection of a WUS is less complex and more energy-efficient. Therefore, the power consumption of the UE can be reduced by detecting a WUS first.

It can be understood that, for the two types of signals, namely, information carried in a PDCCH and a paging message, the foregoing manner provided in some embodiments of the present disclosure may be directly used to determine a corresponding frequency domain position and/or spatial domain position for receiving the signal.

When the signal is the information carried in the PDCCH, the determining the frequency domain position and/or spatial domain position for receiving the signal in step 101 specifically includes:

determining a frequency domain position and/or spatial domain position for monitoring the PDCCH, the receiving the signal at the determined frequency domain position and/or spatial domain position in step 103 may specifically include:

monitoring the PDCCH at the determined frequency domain position and/or spatial domain position; and receiving the information carried in the PDCCH.

When the signal to be received is the information carried in the PDCCH, in an optional manner, the UE first receives the pre-indication signal (for example, a WUS), and then monitors the PDCCH to receive the information carried in the PDCCH after the pre-indication signal is received.

Before monitoring the PDCCH, optionally, the UE first determines the frequency domain position and/or spatial domain position for monitoring the PDCCH. At this time, the foregoing various manners may be used to re-determine the frequency domain position and/or spatial domain position for monitoring the PDCCH (it can be understood that the re-determined frequency domain position and/or spatial domain position may be the same as or different from a frequency domain position and/or spatial domain position for receiving the pre-indication signal), or the frequency domain position and/or spatial domain position for monitoring the PDCCH may be determined according to information carried in the received pre-indication signal.

It needs to be noted that the information carried in the received pre-indication signal may explicitly indicate the frequency domain position and/or spatial domain position for monitoring the PDCCH or explicitly provide information for determining the frequency domain position and/or spatial domain position, or may implicitly provide information for determining the frequency domain position and/or spatial domain position.

Specifically, when the information carried in the received pre-indication signal includes information for indicating an identifier of a frequency domain position and/or an identifier of a spatial domain position for monitoring the PDCCH, the pre-indication signal explicitly indicates the frequency domain position and/or spatial domain position for monitoring the PDCCH, then the determining, according to the information carried in the received pre-indication signal, the frequency domain position and/or spatial domain position for monitoring the PDCCH may specifically include:

determining a frequency domain position corresponding to the indicated identifier of the frequency domain position for monitoring the PDCCH as the frequency domain position for monitoring the PDCCH; and/or determining a spatial domain position corresponding to the indicated identifier of the spatial domain position for monitoring the PDCCH as the spatial domain position for monitoring the PDCCH.

Specifically, when the information carried in the received pre-indication signal includes frequency domain position-related auxiliary information used for calculating a frequency domain position identifier and/or spatial domain position-related auxiliary information used for calculating a spatial domain position identifier, the pre-indication signal explicitly provides information for determining the frequency domain position and/or spatial domain position, then the determining, according to the information carried in the received pre-indication signal, the frequency domain position and/or spatial domain position for monitoring the PDCCH may specifically include:

performing a calculation according to the frequency domain position-related auxiliary information, determining the frequency domain position identifier according to a result of the calculation, and determining a frequency domain position corresponding to the frequency domain position identifier as the frequency domain position for monitoring the PDCCH; and/or performing a calculation according to the spatial domain position-related auxiliary information, determining the spatial domain position identifier according to a result of the calculation, and determining a spatial domain position corresponding to the spatial domain position identifier as the spatial domain position for monitoring the PDCCH.

It may be understood that for a specific calculation process, the method exemplified in some embodiments of the present disclosure may be used. The auxiliary information received by the UE in the foregoing step 105 may act as the frequency domain position-related auxiliary information and the spatial domain position-related auxiliary information.

Specifically, the pre-indication signal implicitly provides information for determining the frequency domain position and/or spatial domain position, when the information carried in the received pre-indication signal includes one or more of the following:

a sequence group of the received pre-indication signal, a sequence of the received pre-indication signal, a time position at which the received pre-indication signal is transmitted, a frequency domain position of the received pre-indication signal, a spatial domain position of the received pre-indication signal, or a transmission pattern of the received pre-indication signal.

In this case, the determining, according to the information carried in the received pre-indication signal, the frequency domain position and/or spatial domain position for monitoring the PDCCH may specifically include:

determining, according to a correspondence between the information carried in the received pre-indication signal and a frequency domain position identifier, the frequency domain position for monitoring the PDCCH; and/or determining, according to a correspondence between the information carried in the received pre-indication signal and a spatial domain position identifier, the spatial domain position for monitoring the PDCCH.

After monitoring the PDCCH and receiving the information carried in the PDCCH, the UE may further need to receive a paging message. When the signal is specifically the paging message, obviously, the UE may use any one of the foregoing methods provided in some embodiments of the present disclosure. Optionally, a frequency domain position and/or spatial domain position consistent with those used for monitoring the PDCCH and receiving the information carried in the PDCCH may be directly used as a frequency domain position and/or spatial domain position for receiving the paging message. In another implementation, the frequency domain position and/or spatial domain position for receiving the paging message may also be determined according to the information carried in the received PDCCH.

It needs to be noted that the information carried in the received PDCCH may explicitly indicate the frequency domain position and/or spatial domain position for receiving the paging message or explicitly provide information for determining the frequency domain position and/or spatial domain position, or may implicitly provide information for determining the frequency domain position and/or spatial domain position.

Specifically, when the information carried in the received PDCCH includes information for indicating an identifier of a frequency domain position and/or an identifier of a spatial domain position for receiving the paging message, the information carried in the PDCCH explicitly indicates the frequency domain position and/or spatial domain position for receiving the paging message, then the determining, according to the information carried in the received PDCCH, a frequency domain position and/or spatial domain position for receiving the paging message may specifically include:

determining a frequency domain position corresponding to the indicated identifier of the frequency domain position for receiving the paging message as the frequency domain position for receiving the paging message; and/or determining a spatial domain position corresponding to the indicated identifier of the spatial domain position for receiving the paging message as the spatial domain position for receiving the paging message.

Specifically, when the information carried in the received PDCCH includes frequency domain position-related auxiliary information used for calculating a frequency domain position identifier and/or spatial domain position-related auxiliary information used for calculating a spatial domain position identifier, the information carried in the received PDCCH explicitly provides information for determining the frequency domain position and/or spatial domain position, then the determining, according to the information carried in the received PDCCH, a frequency domain position and/or spatial domain position for receiving the paging message includes:

performing a calculation according to the frequency domain position-related auxiliary information, determining the frequency domain position identifier according to a result of the calculation, and determining the frequency domain position corresponding to the frequency domain position identifier as the frequency domain position for receiving the paging message; and/or performing a calculation according to the spatial domain position-related auxiliary information, determining the spatial domain position identifier according to a result of the calculation, and determining a spatial domain position corresponding to the spatial domain position identifier as the spatial domain position for receiving the paging message.

It may be understood that, for a specific calculation process, the method exemplified in some embodiments of the present disclosure may be used. The auxiliary information received by the UE in the foregoing step 105 may act as the frequency domain position-related auxiliary information and the spatial domain position-related auxiliary information.

Specifically, the information carried in the PDCCH implicitly provides information for determining the frequency domain position and/or spatial domain position, when the information carried in the received PDCCH includes one or more of the following: a sequence group of the received PDCCH, a sequence of the received PDCCH, a time position at which the received PDCCH is transmitted, a frequency domain position of the received PDCCH, a spatial domain position of the received PDCCH, or a transmission pattern of the received PDCCH.

In this case, the determining, according to the information carried in the received PDCCH, a frequency domain position and/or spatial domain position for receiving the paging message includes:

determining, according to a correspondence between the information carried in the received PDCCH and a frequency domain position identifier, the frequency domain position for receiving the paging message; and/or determining, according to a correspondence between the information carried in the received PDCCH and a spatial domain position identifier, the spatial domain position for receiving the paging message.

In some embodiments of the present disclosure, before receiving a signal, UE first determines a frequency domain position and/or spatial domain position for receiving the signal; correspondingly, before transmitting a signal to the UE, a network device first determines a frequency domain position and/or spatial domain position for transmitting the signal. Therefore, when there are a plurality of frequency domain positions and/or a plurality of spatial domain positions, by means of the method provided in some embodiments of the present disclosure, a network device can transmit a signal to UE, and the UE can receive the signal transmitted by the network device.

Figure 4:
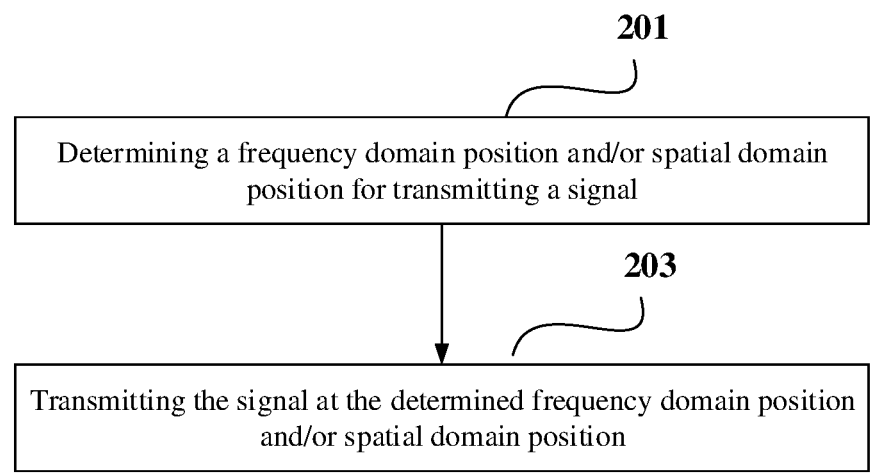
FIG. 4 is yet another schematic flowchart of a signal transmission method performed by a network device according to some embodiments of the present disclosure.

Referring to FIG. 4, the present disclosure further provides in some embodiments a signal transmission method performed by a network device. The method specifically includes the following steps.

A step 201 includes: determining a frequency domain position and/or spatial domain position for transmitting a signal, where the frequency domain position includes one or more of a plurality of frequency domain positions, and the spatial domain position includes one or more of a plurality of spatial domain positions.

A step 203 includes: transmitting the signal at the determined frequency domain position and/or spatial domain position.

The signal is one or more of a pre-indication signal, information carried in a PDCCH, and a paging message.

Optionally, in the method shown in FIG. 4, the frequency domain position for transmitting the signal is: a BWP including a cell-defining synchronization signal block, a BWP for initial access to a cell or a BWP including system information.

Optionally, in the method shown in FIG. 4, the spatial domain position corresponds to a beam identifier.

Optionally, in the method shown in FIG. 4, the spatial domain position for transmitting the signal is: a beam for a cell-defining synchronization signal block, a beam for initial access to a cell or a beam for transmitting system information.

Optionally, in the method shown in FIG. 4, the determining the frequency domain position and/or spatial domain position for transmitting the signal includes:

determining, according to initial information predetermined in a protocol, the frequency domain position and/or spatial domain position for transmitting the signal;

determining, according to preset default information, the frequency domain position and/or spatial domain position for transmitting the signal;

transmitting signal transmission configuration information, and determining, according to the signal transmission configuration information, the frequency domain position and/or spatial domain position for transmitting the signal; or determining, according to an identifier of the UE, the frequency domain position and/or spatial domain position for transmitting the signal.

Optionally, in the method shown in FIG. 4, before the determining the frequency domain position and/or spatial domain position for transmitting the signal, the method further includes:

transmitting frequency domain position-related auxiliary information required for determining the frequency domain position; and/or transmitting spatial domain position-related auxiliary information required for determining the spatial domain position, then the determining the frequency domain position and/or spatial domain position for transmitting the signal includes:

determining, according to the frequency domain position-related auxiliary information and/or the spatial domain position-related auxiliary information, the frequency domain position and/or spatial domain position for transmitting the signal.

Optionally, in the method shown in FIG. 4, the determining, according to the identifier of the UE, the frequency domain position and/or spatial domain position for transmitting the signal includes:

calculating a first ratio of the identifier of the UE to a first quantity, where the first quantity is a total quantity of time domain resource positions available for transmitting the signal within one period;

rounding down the first ratio and calculating the rounded-down first ratio modulo a total quantity of frequency domain positions available for transmitting the signal, to obtain identifier information of the frequency domain position; and/or rounding down the first ratio and calculating the rounded-down first ratio modulo a total quantity of spatial domain positions available for transmitting the signal, to obtain identifier information of the spatial domain position; and determining, according to the identifier information of the frequency domain position, the frequency domain position for transmitting the signal; and/or determining, according to the identifier information of the spatial domain position, the spatial domain position for transmitting the signal.

Optionally, in the method shown in FIG. 4, the determining, according to the identifier of the UE, the frequency domain position and/or spatial domain position for transmitting the signal includes:

calculating a second ratio of the identifier of the UE to a second quantity, where the second quantity is a period for transmitting the signal;

rounding down the second ratio and calculating the rounded-down second ratio modulo a total quantity of frequency domain positions available for transmitting the signal, to obtain identifier information of the frequency domain position; and/or rounding down the second ratio and calculating the rounded-down second ratio modulo a total quantity of spatial domain positions available for transmitting the signal, to obtain identifier information of the spatial domain position; and determining, according to the identifier information of the frequency domain position, the frequency domain position for transmitting the signal; and/or determining, according to the identifier information of the spatial domain position, the spatial domain position for transmitting the signal.

Optionally, in the method shown in FIG. 4, the determining, according to the identifier of the UE, the frequency domain position and/or spatial domain position for transmitting the signal includes:

calculating a first ratio of the identifier of the UE to a first quantity, where the first quantity is a total quantity of resource positions available for transmitting the signal within one period;

rounding down the first ratio and calculating the rounded-down first ratio modulo a weight sum of frequency domain positions available for transmitting the signal, and determining identifier information of the frequency domain position according to a value of x that satisfies a first preset condition; and/or rounding down the first ratio and calculating the rounded-down first ratio modulo a weight sum of spatial domain positions available for transmitting the signal, and determining identifier information of the spatial domain position according to a value of x that satisfies a second preset condition, where the first preset condition is that a result of the modulo operation is less than a weight sum of frequency domain positions of the x number of signals, and/or, the second preset condition is that a result of the modulo operation is less than a weight sum of spatial domain positions of the x number of signals; and determining, according to the identifier information of the frequency domain position, the frequency domain position for transmitting the signal; and/or determining, according to the identifier information of the spatial domain position, the spatial domain position for transmitting the signal.

Optionally, in the method shown in FIG. 4, when the signal is the information carried in the PDCCH, the determining the frequency domain position and/or spatial domain position for transmitting the signal includes:

determining a frequency domain position and/or spatial domain position at which the UE monitors the PDCCH, then the transmitting the signal at the determined frequency domain position and/or spatial domain position includes:

transmitting the information carried in the PDCCH at the determined frequency domain position and/or spatial domain position.

Optionally, in the method shown in FIG. 4, the determining a frequency domain position and/or spatial domain position at which the UE monitors the PDCCH includes:

determining, according to information carried in the pre-indication signal transmitted to the UE, the frequency domain position and/or spatial domain position at which the UE monitors the PDCCH.

Optionally, in the method shown in FIG. 4, the information carried in the pre-indication signal transmitted to the UE includes information for indicating an identifier of a frequency domain position and/or an identifier of a spatial domain position for monitoring the PDCCH;

the determining, according to information carried in the pre-indication signal transmitted to the UE, the frequency domain position and/or spatial domain position at which the UE monitors the PDCCH includes:

determining a frequency domain position corresponding to the indicated identifier of the frequency domain position for monitoring the PDCCH as the frequency domain position at which the UE monitors the PDCCH; and/or determining a spatial domain position corresponding to the indicated identifier of the spatial domain position for monitoring the PDCCH as the spatial domain position at which the UE monitors the PDCCH.

Optionally, in the method shown in FIG. 4, the information carried in the pre-indication signal transmitted to the UE includes frequency domain position-related auxiliary information used for calculating a frequency domain position identifier and spatial domain position-related auxiliary information used for calculating a spatial domain position identifier;

the determining, according to information carried in the pre-indication signal transmitted to the UE, the frequency domain position and/or spatial domain position at which the UE monitors the PDCCH includes:

performing a calculation according to the frequency domain position-related auxiliary information, determining the frequency domain position identifier according to a result of the calculation, and determining a frequency domain position corresponding to the frequency domain position identifier as the frequency domain position at which the UE monitors the PDCCH; and/or performing a calculation according to the spatial domain position-related auxiliary information, determining the spatial domain position identifier according to a result of the calculation, and determining a spatial domain position corresponding to the spatial domain position identifier as the spatial domain position at which the UE monitors the PDCCH.

Optionally, in the method shown in FIG. 4, the information carried in the pre-indication signal transmitted to the UE includes one or more of:

a sequence group of the pre-indication signal transmitted to the UE;

a sequence of the pre-indication signal transmitted to the UE;

a time position at which the pre-indication signal transmitted to the UE is transmitted;

a frequency domain position of the pre-indication signal transmitted to the UE;

a spatial domain position of the pre-indication signal transmitted to the UE; or a transmission pattern of the pre-indication signal transmitted to the UE, the determining, according to information carried in the pre-indication signal transmitted to the UE, the frequency domain position and/or spatial domain position at which the UE monitors the PDCCH includes:

determining, according to a correspondence between the information carried in the pre-indication signal transmitted to the UE and a frequency domain position identifier, the frequency domain position at which the UE monitors the PDCCH; and/or determining, according to a correspondence between the information carried in the pre-indication signal transmitted to the UE and a spatial domain position identifier, the spatial domain position at which the UE monitors the PDCCH.

Optionally, in the method shown in FIG. 4, when the signal is the paging message, the determining the frequency domain position and/or spatial domain position for transmitting the signal includes:

determining, according to the information carried in the PDCCH transmitted to the UE, a frequency domain position and/or spatial domain position for transmitting the paging message.

Optionally, in the method shown in FIG. 4, the information carried in the PDCCH transmitted to the UE includes information for indicating an identifier of a frequency domain position and/or an identifier of a spatial domain position for transmitting the paging message, the determining, according to the information carried in the PDCCH transmitted to the UE, the frequency domain position and/or spatial domain position for transmitting the paging message includes:

determining a frequency domain position corresponding to the indicated identifier of the frequency domain position for transmitting the paging message as the frequency domain position for transmitting the paging message; and/or determining a spatial domain position corresponding to the indicated identifier of the spatial domain position for transmitting the paging message as the spatial domain position for transmitting the paging message.

Optionally, in the method shown in FIG. 4, the information carried in the PDCCH transmitted to the UE includes frequency domain position-related auxiliary information used for calculating a frequency domain position identifier and spatial domain position-related auxiliary information used for calculating a spatial domain position identifier, the determining, according to the information carried in the PDCCH transmitted to the UE, the frequency domain position and/or spatial domain position for transmitting the paging message includes:

performing a calculation according to the frequency domain position-related auxiliary information, determining the frequency domain position identifier according to a result of the calculation, and determining the frequency domain position corresponding to the frequency domain position identifier as the frequency domain position for transmitting the paging message; and/or performing a calculation according to the spatial domain position-related auxiliary information, determining the spatial domain position identifier according to a result of the calculation, and determining a spatial domain position corresponding to the spatial domain position identifier as the spatial domain position for transmitting the paging message.

Optionally, in the method shown in FIG. 4, the information carried in the PDCCH transmitted to the UE includes one or more of:

a sequence group of the PDCCH transmitted to the UE;

a sequence of the PDCCH transmitted to the UE;

a time position at which the PDCCH transmitted to the UE is transmitted;

a frequency domain position of the PDCCH transmitted to the UE;

a spatial domain position of the PDCCH transmitted to the UE; or a transmission pattern of the PDCCH transmitted to the UE, the determining, according to the information carried in the PDCCH transmitted to the UE, the frequency domain position and/or spatial domain position for transmitting the paging message includes:

determining, according to a correspondence between the information carried in the PDCCH transmitted to the UE and a frequency domain position identifier, the frequency domain position for transmitting the paging message; and/or determining, according to a correspondence between the information carried in the PDCCH transmitted to the UE and a spatial domain position identifier, the spatial domain position for transmitting the paging message.

Optionally, in the method shown in FIG. 4, the frequency domain position-related auxiliary information includes one or more of:

a BWP identifier, a frequency value and/or a frequency identifier, a bandwidth value and/or a bandwidth identifier, an SCS identifier, a numerology identifier, a PRB identifier, an offset and/or an identifier of an offset between the frequency domain position for transmitting the signal and a reference frequency, a PRB offset and/or an identifier of a PRB offset between the frequency domain position for transmitting the signal and a cell reference PRB.

Optionally, in the method shown in FIG. 4, the spatial domain position-related auxiliary information includes one or more of:

a beam identifier, a beam pair QCL identifier, a TRP identifier, an SSB identifier, a CSI-RS identifier, and a DMRS identifier.

It may be understood that the foregoing signal transmission method performed on a network device side and the foregoing signal receiving method performed on a UE side correspond to each other, and use a consistent manner of determining a frequency domain position and/or spatial domain position and consistent information, so that a signal can be received and transmitted at the same frequency domain position and/or spatial domain position on the network device side.

In some embodiments of the present disclosure, before receiving a signal, UE first determines a frequency domain position and/or spatial domain position for receiving the signal; correspondingly, before transmitting a signal to the UE, a network device first determines a frequency domain position and/or spatial domain position for transmitting the signal. Therefore, when there are a plurality of frequency domain positions and/or a plurality of spatial domain positions, by means of the method provided in some embodiments of the present disclosure, a network device can transmit a signal to UE, and the UE can receive the signal transmitted by the network device.

Figure 5:
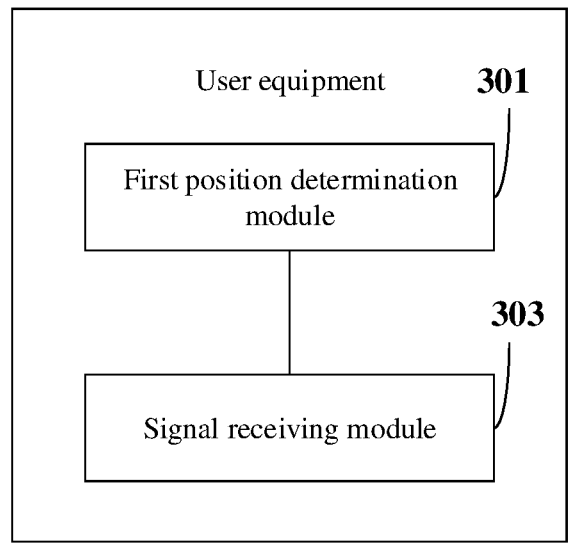
FIG. 5 is a schematic structural diagram of UE according to some embodiments of the present disclosure.

The present disclosure further provides in some embodiments UE. Referring to FIG. 5, the UE includes:

a first position determination module 301, configured to determine a frequency domain position and/or spatial domain position for receiving a signal, where the frequency domain position includes one or more of a plurality of frequency domain positions, and the spatial domain position includes one or more of a plurality of spatial domain positions; and a signal receiving module 303, configured to receive the signal at the determined frequency domain position and/or spatial domain position, where the signal is one or more of a pre-indication signal, information carried in a PDCCH, and a paging message.

Optionally, in the UE shown in FIG. 5, the frequency domain position for receiving the signal is: a BWP including a cell-defining synchronization signal block, a BWP for initial access to a cell or a BWP including system information.

Optionally, in the UE shown in FIG. 5, the spatial domain position corresponds to a beam identifier.

Optionally, in the UE shown in FIG. 5, the spatial domain position for receiving the signal is:

a beam for a cell-defining synchronization signal block, a beam for initial access to a cell or a beam for receiving system information.

Optionally, in the UE shown in FIG. 5, the first position determination module specifically includes:

a first position determination unit, configured to determine, according to initial information predetermined in a protocol, the frequency domain position and/or spatial domain position for receiving the signal;

a second position determination unit, configured to determine, according to received preset default information, the frequency domain position and/or spatial domain position for receiving the signal;

a third position determination unit, configured to: receive signal reception configuration information, and determine, according to the signal reception configuration information, the frequency domain position and/or spatial domain position for receiving the signal; or a fourth position determination unit, configured to determine, according to an identifier of the UE, the frequency domain position and/or spatial domain position for receiving the signal.

Optionally, the UE shown in FIG. 5 further includes:

an auxiliary information receiving module, configured to: receive frequency domain position-related auxiliary information required for determining the frequency domain position; and/or receive spatial domain position-related auxiliary information required for determining the spatial domain position;

the first position determination module is specifically configured to:

determine, according to the frequency domain position-related auxiliary information and/or the spatial domain position-related auxiliary information, the frequency domain position and/or spatial domain position for receiving the signal.

Optionally, in the UE shown in FIG. 5, the fourth position determination unit is specifically configured to:

calculate a first ratio of the identifier of the UE to a first quantity, where the first quantity is a total quantity of time domain resource positions available for transmitting the signal within one period;

round down the first ratio and calculate the rounded-down first ratio modulo a total quantity of frequency domain positions available for transmitting the signal, to obtain identifier information of the frequency domain position; and/or round down the first ratio and calculate the rounded-down first ratio modulo a total quantity of spatial domain positions available for transmitting the signal, to obtain identifier information of the spatial domain position; and determine, according to the identifier information of the frequency domain position, the frequency domain position for receiving the signal; and/or determine, according to the identifier information of the spatial domain position, the spatial domain position for receiving the signal.

Optionally, in the UE shown in FIG. 5, the fourth position determination unit is specifically configured to:

calculate a second ratio of the identifier of the UE to a second quantity, where the second quantity is a period for receiving the signal;

round down the second ratio and calculate the rounded-down second ratio modulo a total quantity of frequency domain positions available for transmitting the signal, to obtain identifier information of the frequency domain position; and/or round down the second ratio and calculate the rounded-down second ratio modulo a total quantity of spatial domain positions available for transmitting the signal, to obtain identifier information of the spatial domain position; and determine, according to the identifier information of the frequency domain position, the frequency domain position for receiving the signal; and/or determine, according to the identifier information of the spatial domain position, the spatial domain position for receiving the signal.

Optionally, in the UE shown in FIG. 5, the fourth position determination unit is specifically configured to:

calculate a first ratio of the identifier of the UE to a first quantity, where the first quantity is a total quantity of resource positions available for transmitting the signal within one period;

round down the first ratio and calculate the rounded-down first ratio modulo a weight sum of frequency domain positions available for transmitting the signal, and determine identifier information of the frequency domain position according to a value of x that satisfies a first preset condition; and/or round down the first ratio and calculate the rounded-down first ratio modulo a weight sum of spatial domain positions available for transmitting the signal, and determine identifier information of the spatial domain position according to a value of x that satisfies a second preset condition, where the first preset condition is that a result of the modulo operation is less than a weight sum of frequency domain positions of the x number of signals, and/or, the second preset condition is that a result of the modulo operation is less than a weight sum of spatial domain positions of the x number of signals; and determine, according to the identifier information of the frequency domain position, the frequency domain position for receiving the signal; and/or determine, according to the identifier information of the spatial domain position, the spatial domain position for receiving the signal.

Optionally, in the UE shown in FIG. 5, when the signal is the information carried in the PDCCH, the first position determination module includes:

a monitoring position determination unit, configured to determine a frequency domain position and/or spatial domain position for monitoring the PDCCH, the signal receiving module is specifically configured to:
monitor the PDCCH at the determined frequency domain position and/or spatial domain position; and
receive the information carried in the PDCCH.

Optionally, in the UE shown in FIG. 5, the monitoring position determination unit is specifically configured to:

determine, according to information carried in the received pre-indication signal, the frequency domain position and/or spatial domain position for monitoring the PDCCH.

Optionally, in the UE shown in FIG. 5, the information carried in the received pre-indication signal includes information for indicating an identifier of a frequency domain position and/or an identifier of a spatial domain position for monitoring the PDCCH, the monitoring position determination unit is specifically configured to:

determine a frequency domain position corresponding to the indicated identifier of the frequency domain position for monitoring the PDCCH as the frequency domain position for monitoring the PDCCH; and/or determine a spatial domain position corresponding to the indicated identifier of the spatial domain position for monitoring the PDCCH as the spatial domain position for monitoring the PDCCH.

Optionally, in the UE shown in FIG. 5, the information carried in the received pre-indication signal includes frequency domain position-related auxiliary information used for calculating a frequency domain position identifier and spatial domain position-related auxiliary information used for calculating a spatial domain position identifier, the monitoring position determination unit is specifically configured to:

perform a calculation according to the frequency domain position-related auxiliary information, determine the frequency domain position identifier according to a result of the calculation, and determine a frequency domain position corresponding to the frequency domain position identifier as the frequency domain position for monitoring the PDCCH; and/or perform a calculation according to the spatial domain position-related auxiliary information, determine the spatial domain position identifier according to a result of the calculation, and determine a spatial domain position corresponding to the spatial domain position identifier as the spatial domain position for monitoring the PDCCH.

Optionally, in the UE shown in FIG. 5, the information carried in the received pre-indication signal includes one or more of:

a sequence group of the received pre-indication signal;
a sequence of the received pre-indication signal;
a time position at which the received pre-indication signal is transmitted;
a frequency domain position of the received pre-indication signal;
a spatial domain position of the received pre-indication signal; or
a transmission pattern of the received pre-indication signal, the monitoring position determination unit is specifically configured to:

determine, according to a correspondence between the information carried in the received pre-indication signal and a frequency domain position identifier, the frequency domain position for monitoring the PDCCH; and/or determine, according to a correspondence between the information carried in the received pre-indication signal and a spatial domain position identifier, the spatial domain position for monitoring the PDCCH.

Optionally, in the UE shown in FIG. 5, when the signal is the paging message, the first position determination module is specifically configured to:

determine, according to the information carried in the received PDCCH, a frequency domain position and/or spatial domain position for receiving the paging message.

Optionally, in the UE shown in FIG. 5, the information carried in the received PDCCH includes information for indicating an identifier of a frequency domain position and/or an identifier of a spatial domain position for receiving the paging message, the first position determination module is specifically configured to:
determine a frequency domain position corresponding to the indicated identifier of the frequency domain position for receiving the paging message as the frequency domain position for receiving the paging message; and/or
determine a spatial domain position corresponding to the indicated identifier of the spatial domain position for receiving the paging message as the spatial domain position for receiving the paging message.

Optionally, in the UE shown in FIG. 5, the information carried in the received PDCCH includes frequency domain position-related auxiliary information used for calculating a frequency domain position identifier and spatial domain position-related auxiliary information used for calculating a spatial domain position identifier,
the first position determination module is specifically configured to:
perform a calculation according to the frequency domain position-related auxiliary information, determine the frequency domain position identifier according to a result of the calculation, and determine the frequency domain position corresponding to the frequency domain position identifier as the frequency domain position for receiving the paging message; and/or
perform a calculation according to the spatial domain position-related auxiliary information, determine the spatial domain position identifier according to a result of the calculation, and determine the spatial domain position corresponding to the spatial domain position identifier as the spatial domain position for receiving the paging message.

Optionally, in the UE shown in FIG. 5, the information carried in the received PDCCH includes one or more of:
a sequence group of the received PDCCH;
a sequence of the received PDCCH;
a time position at which the received PDCCH is transmitted;
a frequency domain position of the received PDCCH;
a spatial domain position of the received PDCCH; or
a transmission pattern of the received PDCCH,
the determining, according to the information carried in the received PDCCH, a frequency domain position and/or spatial domain position for receiving the paging message includes:
determining, according to a correspondence between the information carried in the received PDCCH and a frequency domain position identifier, the frequency domain position for receiving the paging message; and/or
determining, according to a correspondence between the information carried in the received PDCCH and a spatial domain position identifier, the spatial domain position for receiving the paging message.

Optionally, in the UE shown in FIG. 5, the frequency domain position-related auxiliary information includes one or more of:
a BWP identifier, a frequency value and/or a frequency identifier, a bandwidth value and/or a bandwidth identifier, an SCS identifier, a numerology identifier, a PRB identifier, an offset and/or an identifier of an offset between the frequency domain position for receiving the signal and a reference frequency, a PRB offset and/or an identifier of a PRB offset between the frequency domain position for receiving the signal and a cell reference PRB.

Optionally, in the UE shown in FIG. 5, the spatial domain position-related auxiliary information includes one or more of:
a beam identifier, a beam pair QCL identifier, a TRP identifier, an SSB identifier, a CSI-RS identifier, and a DMRS identifier.

It may be understood that the UE provided in some embodiments of the present disclosure can implement the processes implemented by the UE in the method embodiment shown in FIG. 1. The related description about the signal receiving method in the embodiment shown in FIG. 1 is applicable to the foregoing UE. To avoid repetition, details are not described herein again.

Figure 6:
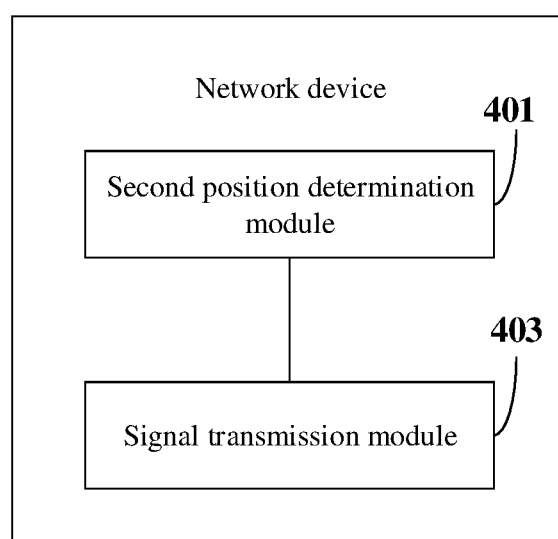
FIG. 6 is a schematic structural diagram of a network device according to some embodiments of the present disclosure.

The present disclosure further provides in some embodiments a network device. Referring to FIG. 6, the network device includes:
a second position determination module 401, configured to determine a frequency domain position and/or spatial domain position for transmitting a signal, where the frequency domain position includes one or more of a plurality of frequency domain positions, and the spatial domain position includes one or more of a plurality of spatial domain positions; and
a signal transmission module 403, configured to transmit the signal at the determined frequency domain position and/or spatial domain position,
where the signal is one or more of a pre-indication signal, information carried in a PDCCH, and a paging message.

Optionally, in the network device shown in FIG. 6, the frequency domain position for transmitting the signal is: a BWP including a cell-defining synchronization signal block, a BWP for initial access to a cell or a BWP including system information.

Optionally, in the network device shown in FIG. 6, the spatial domain position corresponds to a beam identifier.

Optionally, in the network device shown in FIG. 6, the spatial domain position for transmitting the signal is: a beam for a cell-defining synchronization signal block, a beam for initial access to a cell or a beam for transmitting system information.

Optionally, in the network device shown in FIG. 6, the second position determination module includes:
a first position determination unit, configured to determine, according to initial information predetermined in a protocol, the frequency domain position and/or spatial domain position for transmitting the signal;
a second position determination unit, configured to determine, according to preset default information, the frequency domain position and/or spatial domain position for transmitting the signal;
a third position determination unit, configured to: transmit signal transmission configuration information, and determine, according to the signal transmission configuration information, the frequency domain position and/or spatial domain position for transmitting the signal; or
a fourth position determination unit, configured to determine, according to an identifier of UE, the frequency domain position and/or spatial domain position for transmitting the signal.

Optionally, the network device shown in FIG. 6 further includes:
an auxiliary information transmission module, configured to: transmit frequency domain position-related auxiliary information required for determining the frequency domain position; and/or transmit spatial domain position-related auxiliary information required for determining the spatial domain position, the second position determination module is specifically configured to:

determine, according to the frequency domain position-related auxiliary information and/or the spatial domain position-related auxiliary information, the frequency domain position and/or spatial domain position for transmitting the signal.

Optionally, in the network device shown in FIG. 6, the fourth position determination unit is specifically configured to:

calculate a first ratio of the identifier of the UE to a first quantity, where the first quantity is a total quantity of time domain resource positions available for transmitting the signal within one period;

round down the first ratio and calculate the rounded-down first ratio modulo a total quantity of frequency domain positions available for transmitting the signal, to obtain identifier information of the frequency domain position; and/or round down the first ratio and calculate the rounded-down first ratio modulo a total quantity of spatial domain positions available for transmitting the signal, to obtain identifier information of the spatial domain position; and determine, according to the identifier information of the frequency domain position, the frequency domain position for transmitting the signal; and/or determine, according to the identifier information of the spatial domain position, the spatial domain position for transmitting the signal.

Optionally, in the network device shown in FIG. 6, the fourth position determination unit is specifically configured to:

calculate a second ratio of the identifier of the UE to a second quantity, where the second quantity is a period for transmitting the signal;

round down the second ratio and calculate the rounded-down second ratio modulo a total quantity of frequency domain positions available for transmitting the signal, to obtain identifier information of the frequency domain position; and/or round down the second ratio and calculate the rounded-down second ratio modulo a total quantity of spatial domain positions available for transmitting the signal, to obtain identifier information of the spatial domain position; and determine, according to the identifier information of the frequency domain position, the frequency domain position for transmitting the signal; and/or determine, according to the identifier information of the spatial domain position, the spatial domain position for transmitting the signal.

Optionally, in the network device shown in FIG. 6, the fourth position determination unit is specifically configured to:

calculate a first ratio of the identifier of the UE to a first quantity, where the first quantity is a total quantity of resource positions available for transmitting the signal within one period;

round down the first ratio and calculate the rounded-down first ratio modulo a weight sum of frequency domain positions available for transmitting the signal, and determine identifier information of the frequency domain position according to a value of x that satisfies a first preset condition; and/or round down the first ratio and calculate the rounded-down first ratio modulo a weight sum of spatial domain positions available for transmitting the signal, and determine identifier information of the spatial domain position according to a value of x that satisfies a second preset condition, where the first preset condition is that a result of the modulo operation is less than a weight sum of frequency domain positions of the x number of signals, and/or, the second preset condition is that a result of the modulo operation is less than a weight sum of spatial domain positions of the x number of signals; and determine, according to the identifier information of the frequency domain position, the frequency domain position for transmitting the signal; and/or determine, according to the identifier information of the spatial domain position, the spatial domain position for transmitting the signal.

Optionally, in the network device shown in FIG. 6, when the signal is the information carried in the PDCCH, the second position determination module includes:

a monitoring position determination unit, configured to determine a frequency domain position and/or spatial domain position for monitoring the PDCCH by UE, the signal transmission module is specifically configured to:

transmit the information carried in the PDCCH at the determined frequency domain position and/or spatial domain position.

Optionally, in the network device shown in FIG. 6, the monitoring position determination unit is specifically configured to:

determine, according to information carried in the pre-indication signal transmitted to the UE, the frequency domain position and/or spatial domain position at which the UE monitors the PDCCH.

Optionally, in the network device shown in FIG. 6, the information carried in the pre-indication signal transmitted to the UE includes information for indicating an identifier of a frequency domain position and/or an identifier of a spatial domain position for monitoring the PDCCH, the monitoring position determination unit is specifically configured to:

determine a frequency domain position corresponding to the indicated identifier of the frequency domain position for monitoring the PDCCH as the frequency domain position at which the UE monitors the PDCCH; and/or determine a spatial domain position corresponding to the indicated identifier of the spatial domain position for monitoring the PDCCH as the spatial domain position at which the UE monitors the PDCCH.

Optionally, in the network device shown in FIG. 6, the information carried in the pre-indication signal transmitted to the UE includes frequency domain position-related auxiliary information used for calculating a frequency domain position identifier and spatial domain position-related auxiliary information used for calculating a spatial domain position identifier, the monitoring position determination unit is specifically configured to:

perform a calculation according to the frequency domain position-related auxiliary information, determine the frequency domain position identifier according to a result of the calculation, and determine a frequency domain position corresponding to the frequency domain position identifier as the frequency domain position at which the UE monitors the PDCCH; and/or perform a calculation according to the spatial domain position-related auxiliary information, determine the spatial domain position identifier according to a result of the calculation, and determine a spatial domain position corresponding to the spatial domain position identifier as the spatial domain position at which the UE monitors the PDCCH.

Optionally, in the network device shown in FIG. 6, the information carried in the pre-indication signal transmitted to the UE includes one or more of:
- a sequence group of the pre-indication signal transmitted to the UE;
- a sequence of the pre-indication signal transmitted to the UE;
- a time position at which the pre-indication signal transmitted to the UE is transmitted;
- a frequency domain position of the pre-indication signal transmitted to the UE;
- a spatial domain position of the pre-indication signal transmitted to the UE; or
- a transmission pattern of the pre-indication signal transmitted to the UE;

the determining, according to information carried in the pre-indication signal transmitted to the UE, the frequency domain position and/or spatial domain position at which the UE monitors the PDCCH includes:
- determining, according to a correspondence between the information carried in the pre-indication signal transmitted to the UE and a frequency domain position identifier, the frequency domain position at which the UE monitors the PDCCH; and/or
- determining, according to a correspondence between the information carried in the pre-indication signal transmitted to the UE and a spatial domain position identifier, the spatial domain position at which the UE monitors the PDCCH.

Optionally, in the network device shown in FIG. 6, when the signal is the paging message, the second position determination module is specifically configured to:
- determine, according to the information carried in the PDCCH transmitted to UE, a frequency domain position and/or spatial domain position for transmitting the paging message.

Optionally, in the network device shown in FIG. 6, the information carried in the PDCCH transmitted to the UE includes information for indicating an identifier of a frequency domain position and/or an identifier of a spatial domain position for transmitting the paging message;
the second position determination module is specifically configured to:
- determining a frequency domain position corresponding to the indicated identifier of the frequency domain position for transmitting the paging message as the frequency domain position for transmitting the paging message; and/or
- determining a spatial domain position corresponding to the indicated identifier of the spatial domain position for transmitting the paging message as the spatial domain position for transmitting the paging message.

Optionally, in the network device shown in FIG. 6, the information carried in the PDCCH transmitted to the UE includes frequency domain position-related auxiliary information used for calculating a frequency domain position identifier and spatial domain position-related auxiliary information used for calculating a spatial domain position identifier,
the second position determination module is specifically configured to:
- perform a calculation according to the frequency domain position-related auxiliary information, determine the frequency domain position identifier according to a result of the calculation, and determine the frequency domain position corresponding to the frequency domain position identifier as the frequency domain position for transmitting the paging message; and/or
- perform a calculation according to the spatial domain position-related auxiliary information, determine the spatial domain position identifier according to a result of the calculation, and determine the spatial domain position corresponding to the spatial domain position identifier as the spatial domain position for transmitting the paging message.

Optionally, in the network device shown in FIG. 6, the information carried in the PDCCH transmitted to the UE includes one or more of:
- a sequence group of the PDCCH transmitted to the UE;
- a sequence of the PDCCH transmitted to the UE;
- a time position at which the PDCCH transmitted to the UE is transmitted;
- a frequency domain position of the PDCCH transmitted to the UE;
- a spatial domain position of the PDCCH transmitted to the UE; or
- a transmission pattern of the PDCCH transmitted to the UE, the determining, according to the information carried in the PDCCH transmitted to UE, a frequency domain position and/or spatial domain position for transmitting the paging message includes:
- determining, according to a correspondence between the information carried in the PDCCH transmitted to the UE and a frequency domain position identifier, the frequency domain position for transmitting the paging message; and/or
- determining, according to a correspondence between the information carried in the PDCCH transmitted to the UE and a spatial domain position identifier, the spatial domain position for transmitting the paging message.

Optionally, in the network device shown in FIG. 6, the frequency domain position-related auxiliary information includes one or more of:
- a BWP identifier, a frequency value and/or a frequency identifier, a bandwidth value and/or a bandwidth identifier, an SCS identifier, a numerology identifier, a PRB identifier, an offset and/or an identifier of an offset between the frequency domain position for transmitting the signal and a reference frequency, a PRB offset and/or an identifier of a PRB offset between the frequency domain position for transmitting the signal and a cell reference PRB.

Optionally, in the network device shown in FIG. 6, the spatial domain position-related auxiliary information includes one or more of:
- a beam identifier, a beam pair QCL identifier, a TRP identifier, an SSB identifier, a CSI-RS identifier, and a DMRS identifier.

It may be understood that the network device provided in some embodiments of the present disclosure can implement the processes implemented by the network device in the method embodiment shown in FIG. 4. The corresponding description about the signal transmission method and signal receiving method in the foregoing embodiments is applicable to the foregoing network device. To avoid repetition, details are not described herein again.

Figure 7:
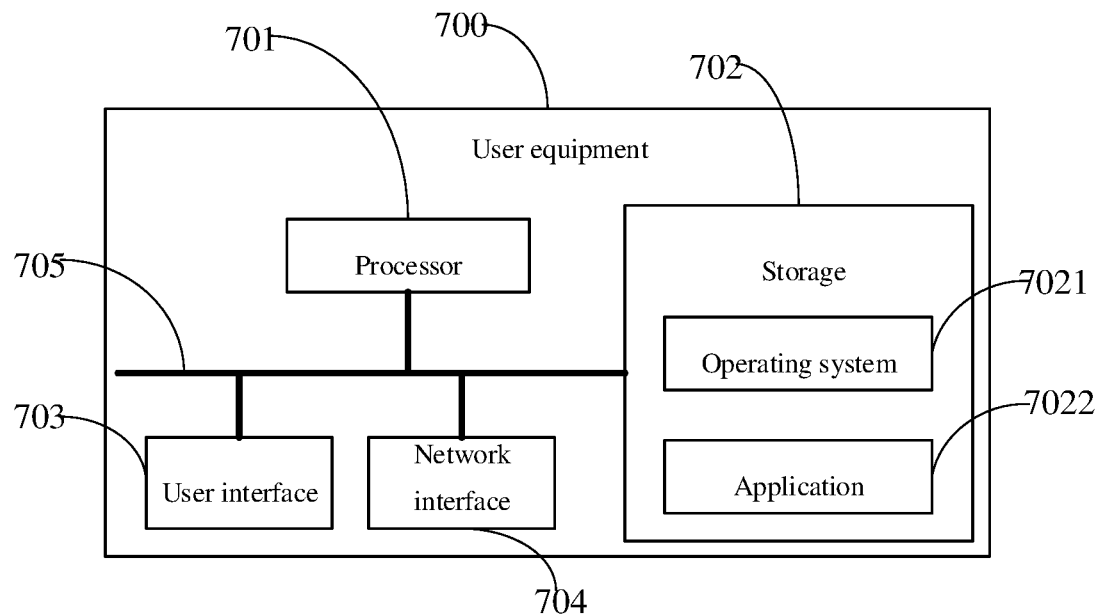
FIG. 7 is another schematic structural diagram of UE according to some embodiments of the present disclosure.

FIG. 7 is a block diagram of UE according to another embodiment of the present disclosure. The UE 700 shown in FIG. 7 includes at least one processor 701, a storage 702, at least one network interface 704, and a user interface 703. The various components in the UE 700 are coupled together by a bus system 705. It may be understood that the bus system 705 is configured to implement connection and communication among these components. The bus system 705 further includes a power bus, a control bus, and a status signal bus in addition to a data bus. However, for clarity of description, various buses in FIG. 7 are all labeled as the bus system 705.

The user interface 703 may include a display, a keyboard or a click device (for example, a mouse), a trackball, a touch pad, a touch screen, or the like.

It may be understood that the storage 702 in some embodiments of the present disclosure may be a volatile storage or a nonvolatile storage, or may include both a volatile storage and a nonvolatile storage. The nonvolatile storage may be a read-only memory (ROM), a programmable ROM (PROM), an erasable programmable PROM (EPROM), an electrically EPROM (EEPROM) or a flash memory. The volatile storage may be a random access memory (RAM), which is used as an external cache. By way of example rather than limitation, many forms of RAMs such as a static RAM (SRAM), a dynamic RAM (DRAM), a synchronous DRAM (SDRAM), a double-data-rate (DDR) SDRAM, an enhanced SDRAM (ESDRAM), a synch link DRAM (SLDRAM), and a direct Rambus RAM (DRRAM) may be used. The storage 702 in the system and method described in some embodiments of the present disclosure is intended to include, but is not limited to, these and any other appropriate types of storages.

In some implementations, the storage 702 stores executable modules or data structures, or a subset thereof, or an extended set thereof, for example, an operating system 7021 and an application 7022.

The operating system 7021 includes various system programs, such as a framework layer program, a core library layer program, and a driver layer program, to implement various basic services and process a hardware-based task. The application 7022 includes various applications such as a media player or a browser, to implement various application services. A program for implementing the method provided in some embodiments of the present disclosure may be included in the application 7022.

In some embodiments of the present disclosure, the UE further includes a computer program stored in the storage and configured to be executed by the processor. The processor is configured to execute the computer program to implement the following steps:
  determining a frequency domain position and/or spatial domain position for receiving a signal, where the frequency domain position includes one or more of a plurality of frequency domain positions, and the spatial domain position includes one or more of a plurality of spatial domain positions; and
  receiving the signal at the determined frequency domain position and/or spatial domain position,
  where the signal is one or more of a pre-indication signal, information carried in a PDCCH, and a paging message.

The foregoing method disclosed in some embodiments of the present disclosure may be applied to the processor 701 or implemented by the processor 701. The processor 701 may be an integrated circuit chip having a signal processing capability. During implementation, the steps in the foregoing method may be accomplished by hardware integrated logic circuits or instructions in a software form in the processor 701. The processor 701 may be a general-purpose processor, a digital signal processor (DSP), an application-specific integrated circuit (ASIC), a field-programmable gate array (FPGA) or other programmable logic device, discrete gate or transistor logic device, a discrete hardware component. The methods, steps, and logic block diagrams disclosed in some embodiments of the present disclosure can be implemented or executed. The general-purpose processor may be a microprocessor or the processor may be any conventional processor or the like. The steps in the method disclosed with reference to some embodiments of the present disclosure may be directly performed and accomplished by a hardware decoding processor, or performed and accomplished by a combination of hardware and software modules in a decoding processor. The software modules may be located in a computer-readable storage medium well-established in the art, such as a RAM, a flash memory, a ROM, a PROM or an electrically erasable programmable memory or a register. A computer-readable storage medium is located in the storage. The processor reads information from the storage and accomplishes the steps in the foregoing method using hardware of the processor. Specifically, a computer program is stored in the computer-readable storage medium. The computer program is configured to be executed by the processor to implement the steps in the foregoing embodiments of the signal receiving method.

It may be understood that these embodiments described in this disclosure may be implemented by hardware, software, firmware, middleware, microcode or a combination thereof. For hardware implementation, a processing unit may be implemented in one or more ASICs, a DSP, a DSP device (DSPD), a programmable logic device (PLD), a field-programmable gate array (FPGA), a general-purpose processor, a controller, a microcontroller, a microprocessor, other electronic unit configured to perform the functions in the present disclosure or a combination thereof.

For a software implementation, the techniques in some embodiments of the present disclosure may be implemented by modules (for example, processes or functions) performing the functions described in some embodiments of the present disclosure. Software codes may be stored in a storage and executed by a processor. The storage may be implemented internal or external to a processor.

Optionally, the processor is configured to execute the computer program to further implement the following steps:
  determining a frequency domain position and/or spatial domain position for receiving a signal, where the frequency domain position includes one or more of a plurality of frequency domain positions, and the spatial domain position includes one or more of a plurality of spatial domain positions; and
  receiving the signal at the determined frequency domain position and/or spatial domain position,
  where the signal is one or more of a pre-indication signal, information carried in a PDCCH, and a paging message.

The UE 700 can implement the processes implemented by the UE in the foregoing embodiments. To avoid repetition, details are not described herein again.

In some embodiments of the present disclosure, before receiving a signal, UE first determines a frequency domain position and/or spatial domain position for receiving the signal; correspondingly, before transmitting a signal to the UE, a network device first determines a frequency domain position and/or spatial domain position for transmitting the signal. Therefore, when there are a plurality of frequency domain positions and/or a plurality of spatial domain positions, by means of the method provided in some embodiments of the present disclosure, a network device can transmit a signal to UE, and the UE can receive the signal transmitted by the network device.

Figure 8:
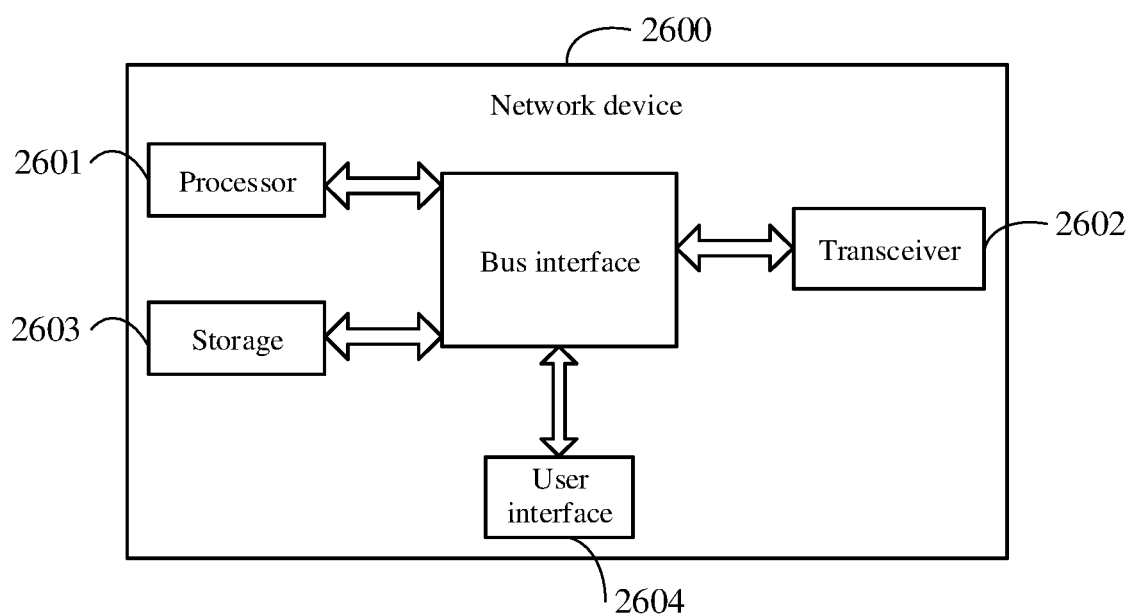
FIG. 8 is still another schematic structural diagram of a network device according to some embodiments of the present disclosure.

Referring to FIG. 8, FIG. 8 is a structural diagram of a network device to which some embodiments of the present disclosure are applied. The network device can implement the details of the signal transmission method in the foregoing embodiments and achieve the same effects. As shown in FIG. 8, the network device 2600 includes a processor 2601, a transceiver 2602, a storage 2603, a user interface 2604, and a bus interface.

In some embodiments of the present disclosure, the network device 2600 further includes a computer program stored in the storage 2603 and configured to be executed by the processor 2601. The processor 2601 is configured to execute the computer program to implement the following steps:

determining a frequency domain position and/or spatial domain position for transmitting a signal, where the frequency domain position includes one or more of a plurality of frequency domain positions, and the spatial domain position includes one or more of a plurality of spatial domain positions; and
 transmitting the signal at the determined frequency domain position and/or spatial domain position,
 where the signal is one or more of a pre-indication signal, information carried in a PDCCH, and a paging message.

In FIG. 8, a bus architecture may include any quantity of interconnected buses and bridges. Various circuits such as one or more processors represented specifically by the processor 2601 and a storage represented by the storage 2603 are linked together. The bus architecture may also link various other circuits such as peripherals, voltage regulators, and power management circuits, which are well known in the art, and therefore are not further described herein. The bus interface provides an interface. The transceiver 2602 may include a plurality of elements, that is, a transmitter and a receiver, to provide units for communicating with various other apparatuses over a transmission medium. For different user equipment, the user interface 2604 may be an interface capable of externally/internally connecting desired devices, including, but not limited to, a keypad, a display, a speaker, a microphone, and a joystick.

The processor 2601 is responsible for managing the bus architecture and general processing. The storage 2603 can store data used by the processor 2601 while performing operations.

Optionally, the present disclosure further provides in some embodiments UE. The UE includes a processor, a storage, and a computer program stored in the storage and executable on the processor. The computer program is configured to be executed by the processor to implement various processes in the embodiments of the foregoing signal receiving method, and can achieve the same technical effects. To avoid repetition, details are not described herein again.

The present disclosure further provides in some embodiments a computer-readable storage medium, where the computer-readable storage medium stores therein a computer program. The computer program is configured to be executed by a processor to implement various processes of the embodiments of the foregoing signal receiving method, and can achieve the same technical effects. To avoid repetition, details are not described herein again. The computer-readable storage medium may be a volatile storage or a nonvolatile storage, or may include both a volatile storage and a nonvolatile storage, for example, a ROM, a RAM, a magnetic disk, an optical disc or the like.

Optionally, the present disclosure further provides in some embodiments a network device. The network device includes a processor, a storage, and a computer program stored in the storage and executable on the processor. The computer program is configured to be executed by the processor to implement various processes in the embodiments of the foregoing signal transmission method, and can achieve the same technical effects. To avoid repetition, details are not described herein again.

The present disclosure further provides in some embodiments a computer-readable storage medium, where the computer-readable storage medium stores therein a computer program. The computer program is configured to be executed by a processor to implement various processes of the embodiments of the foregoing signal transmission method, and can achieve the same technical effects. To avoid repetition, details are not described herein again. The computer-readable storage medium may be a volatile storage or a nonvolatile storage or may include both a volatile storage and a nonvolatile storage, for example, a ROM, a RAM, a magnetic disk, an optical disc or the like.

It should be noted that the terms "include", "have", or any variation thereof used herein are intended to cover a non-exclusive inclusion, such that a process, a method, an article, or a device that includes a list of elements not only includes the list of elements, but also may include other elements not expressly listed or include elements inherent to the process, the method, the article, or the device. In case that there is no further limitation, an element preceded by "includes or including" does not preclude existence of additional identical elements in the process, the method, the article, or the device including the element.

From the foregoing description of the embodiments, a person skilled in the art will clearly appreciate that the method according to the embodiments may be implemented not only by software in conjunction with necessary generic hardware platform, but also by hardware, although the former will be preferred in most cases. Based on such an understanding, essential parts, or parts contributing to the related art, of the technical solution of the present disclosure may be implemented in form of a software product. The software product is stored in a storage medium (e.g., an ROM/RAM, a magnetic disk and an optical disc) and includes several instructions configured to be executed by a terminal (such as a handset, a computer, a server, an air conditioner or a network device) to perform the method according to the embodiments of the present disclosure.

The embodiments of the present disclosure are described above with reference to the accompanying drawings. However, the present disclosure is not limited to the foregoing specific implementations. The foregoing specific implementations are merely illustrative rather than limitative. In light of the teachings of the present disclosure, a person of ordinary skill in the art may further make various forms without departing from the spirit of the present disclosure and the scope of the claims, and these forms all fall within the scope of the present disclosure.

What is claimed is:

1. A signal receiving method, performed by user equipment (UE), comprising:
 determining a frequency domain position and/or spatial domain position for receiving a signal, wherein the frequency domain position comprises one or more of a plurality of frequency domain positions, and the spatial domain position comprises one or more of a plurality of spatial domain positions;
receiving the signal at the determined frequency domain position and/or spatial domain position,
wherein the signal is one or more of a pre-indication signal, information carried in a physical downlink control channel (PDCCH), and a paging message;
wherein, when the signal is the information carried in the PDCCH, the determining the frequency domain position and/or spatial domain position for receiving the signal comprises:
determining a frequency domain position and/or spatial domain position for monitoring the PDCCH,
the receiving the signal at the determined frequency domain position and/or spatial domain position comprises:
monitoring the PDCCH at the determined frequency domain position and/or spatial domain position; and
receiving the information carried in the PDCCH;
or,
when the signal is the paging message, the determining the frequency domain position and/or spatial domain position for receiving the signal comprises:
determining, according to the information carried in the received PDCCH, a frequency domain position and/or spatial domain position for receiving the paging message.

2. The signal receiving method according to claim 1, wherein the frequency domain position corresponds to a bandwidth part (BWP) identifier;
and/or,
the spatial domain position corresponds to a beam identifier.

3. The signal receiving method according to claim 2, wherein the spatial domain position for receiving the signal is:
a beam for a cell-defining synchronization signal block, a beam for initial access to a cell or a beam for receiving system information.

4. The signal receiving method according to claim 1, wherein the frequency domain position for receiving the signal is: a bandwidth part (BWP) comprising a cell-defining synchronization signal block (SSB), a BWP for initial access to a cell or a BWP comprising system information.

5. The signal receiving method according to claim 1, wherein the determining the frequency domain position and/or spatial domain position for receiving the signal comprises:
determining, according to initial information predetermined in a protocol, the frequency domain position and/or spatial domain position for receiving the signal;
determining, according to received preset default information, the frequency domain position and/or spatial domain position for receiving the signal;
receiving signal reception configuration information, and determining, according to the signal reception configuration information, the frequency domain position and/or spatial domain position for receiving the signal; or
determining, according to an identifier of the UE, the frequency domain position and/or spatial domain position for receiving the signal.

6. The signal receiving method according to claim 5, wherein the determining, according to the identifier of the UE, the frequency domain position and/or spatial domain position for receiving the signal comprises:
calculating a first ratio of the identifier of the UE to a first quantity, wherein the first quantity is a total quantity of time domain resource positions available for transmitting the signal within one period;
rounding down the first ratio and calculating the rounded-down first ratio modulo a total quantity of frequency domain positions available for transmitting the signal, to obtain identifier information of the frequency domain position; and/or rounding down the first ratio and calculating the rounded-down first ratio modulo a total quantity of spatial domain positions available for transmitting the signal, to obtain identifier information of the spatial domain position; and
determining, according to the identifier information of the frequency domain position, the frequency domain position for receiving the signal; and/or determining, according to the identifier information of the spatial domain position, the spatial domain position for receiving the signal;
or,
the determining, according to the identifier of the UE, the frequency domain position and/or spatial domain position for receiving the signal comprises:
calculating a second ratio of the identifier of the UE to a second quantity, wherein the second quantity is a period for receiving the signal;
rounding down the second ratio and calculating the rounded-down second ratio modulo a total quantity of frequency domain positions available for transmitting the signal, to obtain identifier information of the frequency domain position; and/or rounding down the second ratio and calculating the rounded-down second ratio modulo a total quantity of spatial domain positions available for transmitting the signal, to obtain identifier information of the spatial domain position; and
determining, according to the identifier information of the frequency domain position, the frequency domain position for receiving the signal; and/or determining, according to the identifier information of the spatial domain position, the spatial domain position for receiving the signal;
or,
the determining, according to the identifier of the UE, the frequency domain position and/or spatial domain position for receiving the signal comprises:
calculating a first ratio of the identifier of the UE to a first quantity, wherein the first quantity is a total quantity of resource positions available for transmitting the signal within one period;
rounding down the first ratio and calculating the rounded-down first ratio modulo a weight sum of frequency domain positions available for transmitting the signal, and determining identifier information of the frequency domain position according to a value of x that satisfies a first preset condition; and/or rounding down the first ratio and calculating the rounded-down first ratio modulo a weight sum of spatial domain positions available for transmitting the signal, and determining identifier information of the spatial domain position according to a value of x that satisfies a second preset condition, wherein the first preset condition is that a result of the modulo operation is less than a weight sum of frequency domain positions of the x number of signals, and/or, the second preset condition is that a result of the modulo operation is less than a weight sum of spatial domain positions of the x number of signals; and determining, according to the identifier information of the frequency domain position, the frequency domain position for receiving the signal; and/or determining, according to the identifier information of the spatial domain position, the spatial domain position for receiving the signal.

7. The signal receiving method according to claim 1, wherein, before the determining the frequency domain position and/or spatial domain position for receiving the signal, the method further comprises:

receiving frequency domain position-related auxiliary information required for determining the frequency domain position; and/or receiving spatial domain position-related auxiliary information required for determining the spatial domain position, the determining the frequency domain position and/or spatial domain position for receiving the signal comprises:

determining, according to the frequency domain position-related auxiliary information and/or the spatial domain position-related auxiliary information, the frequency domain position and/or spatial domain position for receiving the signal.

8. The signal receiving method according to claim 7, wherein the frequency domain position-related auxiliary information comprises one or more of:

a BWP identifier, a frequency value and/or a frequency identifier, a bandwidth value and/or a bandwidth identifier, a sub-carrier spacing (SCS) identifier, a numerology identifier, a physical resource block (PRB) identifier, an offset and/or an identifier of an offset between the frequency domain position for receiving the signal and a reference frequency, a PRB offset and/or an identifier of a PRB offset between the frequency domain position for receiving the signal and a cell reference PRB;

and/or, the spatial domain position-related auxiliary information comprises one or more of:

a beam identifier, a beam pair quasi co-location (QCL) identifier, a transmission reception point (TRP) identifier, a synchronization signal block (SSB) identifier, a channel state information-reference signal (CSI-RS) identifier, and a demodulation reference signal (DMRS) identifier.

9. The signal receiving method according to claim 1, wherein the determining the frequency domain position and/or spatial domain position for monitoring the PDCCH comprises:

determining, according to information carried in received pre-indication signal, the frequency domain position and/or spatial domain position for monitoring the PDCCH.

10. The signal receiving method according to claim 9, wherein the information carried in the received pre-indication signal comprises information for indicating an identifier of a frequency domain position and/or an identifier of a spatial domain position for monitoring the PDCCH, the determining, according to the information carried in the received pre-indication signal, the frequency domain position and/or spatial domain position for monitoring the PDCCH comprises:

determining a frequency domain position corresponding to the indicated identifier of the frequency domain position for monitoring the PDCCH as the frequency domain position for monitoring the PDCCH; and/or determining a spatial domain position corresponding to the indicated identifier of the spatial domain position for monitoring the PDCCH as the spatial domain position for monitoring the PDCCH;

or, the information carried in the received pre-indication signal comprises frequency domain position-related auxiliary information used for calculating a frequency domain position identifier and spatial domain position-related auxiliary information used for calculating a spatial domain position identifier, the determining, according to the information carried in the received pre-indication signal, the frequency domain position and/or spatial domain position for monitoring the PDCCH comprises:

performing a calculation according to the frequency domain position-related auxiliary information, determining the frequency domain position identifier according to a result of the calculation, and determining a frequency domain position corresponding to the frequency domain position identifier as the frequency domain position for monitoring the PDCCH; and/or performing a calculation according to the spatial domain position-related auxiliary information, determining the spatial domain position identifier according to a result of the calculation, and determining a spatial domain position corresponding to the spatial domain position identifier as the spatial domain position for monitoring the PDCCH;

or, the information carried in the received pre-indication signal comprises one or more of:

a sequence group of the received pre-indication signal;

a sequence of the received pre-indication signal;

a time position at which the received pre-indication signal is transmitted;

a frequency domain position of the received pre-indication signal;

a spatial domain position of the received pre-indication signal;

a transmission pattern of the received pre-indication signal, the determining, according to the information carried in the received pre-indication signal, the frequency domain position and/or spatial domain position for monitoring the PDCCH comprises:

determining, according to a correspondence between the information carried in the received pre-indication signal and a frequency domain position identifier, the frequency domain position for monitoring the PDCCH; and/or determining, according to a correspondence between the information carried in the received pre-indication signal and a spatial domain position identifier, the spatial domain position for monitoring the PDCCH.

11. The signal receiving method according to claim 1, wherein the information carried in the received PDCCH comprises information for indicating an identifier of a frequency domain position and/or an identifier of a spatial domain position for receiving the paging message, the determining, according to the information carried in the received PDCCH, a frequency domain position and/or spatial domain position for receiving the paging message comprises:
determining a frequency domain position corresponding to the indicated identifier of the frequency domain position for receiving the paging message as the frequency domain position for receiving the paging message; and/or
determining a spatial domain position corresponding to the indicated identifier of the spatial domain position for receiving the paging message as the spatial domain position for receiving the paging message;
or,
the information carried in the received PDCCH comprises frequency domain position-related auxiliary information used for calculating a frequency domain position identifier and spatial domain position-related auxiliary information used for calculating a spatial domain position identifier,
the determining, according to the information carried in the received PDCCH, a frequency domain position and/or spatial domain position for receiving the paging message comprises:
performing a calculation according to the frequency domain position-related auxiliary information, determining the frequency domain position identifier according to a result of the calculation, and determining the frequency domain position corresponding to the frequency domain position identifier as the frequency domain position for receiving the paging message; and/or
performing a calculation according to the spatial domain position-related auxiliary information, determining the spatial domain position identifier according to a result of the calculation, and determining a spatial domain position corresponding to the spatial domain position identifier as the spatial domain position for receiving the paging message;
or,
the information carried in the received PDCCH comprises one or more of:
a sequence group of the received PDCCH;
a sequence of the received PDCCH;
a time position at which the received PDCCH is transmitted;
a frequency domain position of the received PDCCH;
a spatial domain position of the received PDCCH;
a transmission pattern of the received PDCCH,
the determining, according to the information carried in the received PDCCH, a frequency domain position and/or spatial domain position for receiving the paging message comprises:
determining, according to a correspondence between the information carried in the received PDCCH and a frequency domain position identifier, the frequency domain position for receiving the paging message; and/or
determining, according to a correspondence between the information carried in the received PDCCH and a spatial domain position identifier, the spatial domain position for receiving the paging message.

12. A signal transmission method, performed by a network device, comprising:
determining a frequency domain position and/or spatial domain position for transmitting a signal, wherein the frequency domain position comprises one or more of a plurality of frequency domain positions, and the spatial domain position comprises one or more of a plurality of spatial domain positions;
transmitting the signal at the determined frequency domain position and/or spatial domain position,
wherein the signal is one or more of a pre-indication signal, information carried in a physical downlink control channel (PDCCH), and a paging message;
wherein, when the signal is the information carried in the PDCCH, the determining the frequency domain position and/or spatial domain position for transmitting the signal comprises:
determining a frequency domain position and/or spatial domain position at which user equipment (UE) monitors the PDCCH,
the transmitting the signal at the determined frequency domain position and/or spatial domain position comprises:
transmitting the information carried in the PDCCH at the determined frequency domain position and/or spatial domain position;
or,
when the signal is the paging message, the determining the frequency domain position and/or spatial domain position for transmitting the signal comprises:
determining, according to the information carried in the PDCCH transmitted to user equipment (UE), a frequency domain position and/or spatial domain position for transmitting the paging message.

13. The signal transmission method according to claim 12, wherein the frequency domain position corresponds to a bandwidth part (BWP) identifier;
and/or,
the spatial domain position corresponds to a beam identifier.

14. The signal transmission method according to claim 12, wherein the determining the frequency domain position and/or spatial domain position for transmitting the signal comprises:
determining, according to initial information predetermined in a protocol, the frequency domain position and/or spatial domain position for transmitting the signal;
determining, according to preset default information, the frequency domain position and/or spatial domain position for transmitting the signal;
transmitting signal transmission configuration information, and determining, according to the signal transmission configuration information, the frequency domain position and/or spatial domain position for transmitting the signal; or
determining, according to an identifier of user equipment (UE), the frequency domain position and/or spatial domain position for transmitting the signal.

15. The signal transmission method according to claim 12, wherein, before the determining the frequency domain position and/or spatial domain position for transmitting the signal, the method further comprises:
transmitting frequency domain position-related auxiliary information required for determining the frequency domain position; and/or
transmitting spatial domain position-related auxiliary information required for determining the spatial domain position,
the determining the frequency domain position and/or spatial domain position for transmitting the signal comprises:

determining, according to the frequency domain position-related auxiliary information and/or the spatial domain position-related auxiliary information, the frequency domain position and/or spatial domain position for transmitting the signal.

16. The signal transmission method according to claim 15, wherein the frequency domain position-related auxiliary information comprises one or more of:
a BWP identifier, a frequency value and/or a frequency identifier, a bandwidth value and/or a bandwidth identifier, a sub-carrier spacing (SCS) identifier, a numerology identifier, a physical resource block (PRB) identifier, an offset and/or an identifier of an offset between the frequency domain position for transmitting the signal and a reference frequency, a PRB offset and/or an identifier of a PRB offset between the frequency domain position for transmitting the signal and a cell reference PRB;
and/or,
the spatial domain position-related auxiliary information comprises one or more of:
a beam identifier, a beam pair quasi co-location (QCL) identifier, a transmission reception point (TRP) identifier, a synchronization signal block (SSB) identifier, a channel state information-reference signal (CSI-RS) identifier, and a demodulation reference signal (DMRS) identifier.

17. User equipment (UE), comprising:
a storage, a processor, and a computer program stored in the storage and configured to be executed by the processor, wherein the processor is configured to execute the computer program to implement the steps in the signal receiving method according to claim 1.

18. A non-transitory computer-readable storage medium, comprising:
a computer program stored in the computer-readable storage medium, wherein the computer program is configured to be executed by a processor to implement the steps in the signal receiving method according to claim 1.

19. A network device, comprising:
a storage, a processor, and a computer program stored in the storage and configured to be executed by the processor, wherein the processor is configured to execute the computer program to implement the steps in the signal transmission method according to claim 12.

20. A non-transitory computer-readable storage medium, comprising:
a computer program stored in the computer-readable storage medium, wherein the computer program is configured to be executed by a processor to implement the steps in the signal transmission method according to claim 12.

* * * * *